US012794515B2

(12) United States Patent
Guo et al.

(10) Patent No.: US 12,794,515 B2
(45) Date of Patent: Nov. 10, 2026

(54) REPORTING METHOD AND APPARATUS, AND USER EQUIPMENT, NETWORK-SIDE DEVICE AND STORAGE MEDIUM

(71) Applicant: Beijing Xiaomi Mobile Software Co., Ltd., Beijing (CN)

(72) Inventors: Shengxiang Guo, Beijing (CN); Xueyuan Gao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 286 days.

(21) Appl. No.: 18/695,138

(22) PCT Filed: Sep. 29, 2021

(86) PCT No.: PCT/CN2021/121717
§ 371 (c)(1),
(2) Date: Mar. 25, 2024

(87) PCT Pub. No.: WO2023/050153
PCT Pub. Date: Apr. 6, 2023

(65) Prior Publication Data
US 2024/0421861 A1 Dec. 19, 2024

(51) Int. Cl.
*H04B 7/0413* (2017.01)
*H04B 7/0404* (2017.01)

(52) U.S. Cl.
CPC ......... *H04B 7/0413* (2013.01); *H04B 7/0404* (2013.01)

(58) Field of Classification Search
CPC .... H04B 7/0404; H04B 7/0413; H04B 7/063; H04W 28/18
See application file for complete search history.

(56) References Cited

U.S. PATENT DOCUMENTS

| | | | | |
|---|---|---|---|---|
| 2012/0184281 | A1 | 7/2012 | Kim et al. | |
| 2018/0041981 | A1* | 2/2018 | Wu | H04W 72/51 |
| 2019/0253214 | A1 | 8/2019 | Liu et al. | |
| 2021/0175935 | A1* | 6/2021 | Kwon | H04W 52/0229 |

(Continued)

FOREIGN PATENT DOCUMENTS

| | | | |
|---|---|---|---|
| CN | 111757477 | A | 10/2020 |
| CN | 112534885 | A | 3/2021 |

(Continued)

OTHER PUBLICATIONS

"Discussion on MIMO layer configuration", MediaTek Inc., 3GPP TSG RAN WG1 Meeting #95, R1-1813338, Spokane, USA, Nov. 12-16, 2018, 5 pages.

(Continued)

*Primary Examiner* — Kashif Siddiqui
(74) *Attorney, Agent, or Firm* — Finnegan, Henderson, Farabow, Garrett & Dunner, L.L.P.

(57) ABSTRACT

A reporting method is applied to a User Equipment (UE), and includes: reporting, through a first signaling, to a network device a maximum uplink Multiple-in Multiple-Out (MIMO) layer number supported by the UE, and reporting, through a second signaling, to the network device a maximum uplink MIMO layer number supported by the UE, wherein the maximum uplink MIMO layer number reported through the first signaling is different from the maximum uplink MIMO layer number reported through the second signaling; or reporting, through at least one of the first signaling or the second signaling, to the network device a maximum uplink MIMO layer number supported by the UE, wherein the maximum uplink MIMO layer number reported through the first signaling is the same as the maximum uplink MIMO layer number reported through the second signaling.

15 Claims, 7 Drawing Sheets

(56) References Cited

U.S. PATENT DOCUMENTS

| | | | | |
|---|---|---|---|---|
| 2022/0287025 | A1* | 9/2022 | Jin | H04W 52/02 |
| 2022/0393740 | A1* | 12/2022 | Nimbalker | H04B 7/0628 |

FOREIGN PATENT DOCUMENTS

| | | | |
|---|---|---|---|
| CN | 112953606 | A | 6/2021 |
| CN | 113365263 | A | 9/2021 |
| WO | 2015020440 | A1 | 2/2015 |
| WO | 2020165413 | A1 | 8/2020 |
| WO | WO 2021/016768 | A1 | 2/2021 |
| WO | 2021042912 | A1 | 3/2021 |
| WO | WO 2021/091471 | A1 | 5/2021 |

OTHER PUBLICATIONS

Extended European Search Report Issued in Application No. 21958743.3 dated Oct. 25, 2024, 14 pages.

Ericsson, "UE adaptation to maximum number of MIMO layer," 3GPP TSG-RAN2 Meeting #107bis, R2-1913199, Chongqing, China, Oct. 14-18, 2019, 9 pages.

Spreadtrum Communications, "Considertion on UE adaptation to maximum number of MIMO layers," 3GPP TSG RAN WG1 Meeting #98bis, R1-1910011, Chongqing, China, Oct. 14th-20th, 2019, 5 pages.

International Search Report of International Application No. PCT/CN2021/121717, dated Jun. 1, 2022, 6 pages.

Indian Office Action for IN Application No. 202427031900, dated Apr. 17, 2026.

Chinese Office Action for CN Application No. 202180002945.5, dated Aug. 6, 2025.

OPPO, "New WID on 3Tx handheld UE for NR", R4-2113910, 3GPP TSG-RAN WG4 Meeting # 100-e, Electronic Meeting, Aug. 16-27, 2021.

ETSI, "User Equipment (UE) radio access capabilities", ETSI TS 138 306 V15.3.0 (Oct. 2018).

* cited by examiner

REPORTING METHOD AND APPARATUS, AND USER EQUIPMENT, NETWORK-SIDE DEVICE AND STORAGE MEDIUM

CROSS-REFERENCE

The present application is a U.S. National Stage of International Application No. PCT/CN2021/121717, filed on Sep. 29, 2021, the contents of which are incorporated herein by reference in its entirety.

TECHNICAL FIELD

The present disclosure relates to the field of communication technologies, and in particular to a reporting method and apparatus, a user equipment, a network device and a storage medium.

BACKGROUND

In 5G communication networks, uplink performance needs to be further improved due to imbalance in throughput between uplink and downlink, where the uplink performance is generally improved by introducing uplink multiple-in multiple-out (MIMO) technologies.

SUMMARY

The present disclosure provides a reporting method and apparatus, a user equipment, a network device and a storage medium.

A reporting method provided by an aspect of embodiments of the present disclosure is applied to a UE and includes:

reporting, through a first signaling, to a network device a maximum uplink Multiple-In Multiple-Out (MIMO) layer number supported by the UE, and reporting, through a second signaling, to the network device a maximum uplink MIMO layer number supported by the UE, wherein the maximum uplink MIMO layer number reported through the first signaling is different from the maximum uplink MIMO layer number reported through the second signaling; or reporting, through the first signaling and/or the second signaling, to the network device a maximum uplink MIMO layer number supported by the UE, wherein the maximum uplink MIMO layer number reported through the first signaling is the same as the maximum uplink MIMO layer number reported through the second signaling.

A reporting method provided by another aspect of embodiments of the present disclosure is applied to a base stations and includes:

acquiring a first signaling and a second signaling reported by a UE, wherein the first signaling includes a maximum uplink MIMO layer number supported by the UE, the second signaling includes a maximum uplink MIMO layer number supported by the UE, and the maximum uplink MIMO layer number included in the first signaling is different from the maximum uplink MIMO layer number included in the second signaling; or acquiring the first signaling and/or the second signaling reported by the UE, wherein the maximum uplink MIMO layer number included in the first signaling is the same as the maximum uplink MIMO layer number included in the second signaling; and configuring a MIMO layer number for the UE based on the first signaling and/or the second signaling.

A communication device provided by still another aspect of embodiments of the present disclosure includes a processor and a memory, wherein a computer program is stored in the memory, and the processor executes the computer program stored in the memory to cause the communication device to execute the method provided in the aspect of the above embodiments.

A communication device provided by still another aspect of embodiments of the present disclosure includes a processor and a memory, wherein a computer program is stored in the memory, and the processor executes the computer program stored in the memory to cause the communication device to execute the method provided in the other aspect of the above embodiments.

A communication device provided by still another aspect of embodiments of the present disclosure includes a processor and an interface circuit; and wherein the interface circuit is configured to receive code instructions and transmit the code instructions to the processor; and the processor is configured to run the code instructions to execute the method provided in the aspect of the above embodiments.

A communication device provided by still another aspect of embodiments of the present disclosure includes a processor and an interface circuit; and wherein interface circuit is configured to receive code instructions and transmit the code instructions to the processor; and the processor is configured to run the code instructions to execute the method provided in the other aspect of the above embodiments.

A computer-readable storage medium provided by still another aspect of embodiments of the present disclosure is configured to store instructions, wherein the instructions, when executed, cause the method provided in the aspect of the above embodiments.

A computer-readable storage medium provided by still another aspect of embodiments of the present disclosure is configured to store instructions, wherein the instructions, when executed, cause the method provided in the other aspect of the above embodiments.

BRIEF DESCRIPTION OF THE DRAWINGS

The above and/or additional aspects and advantages of the present disclosure will become apparent and readily understood from the following description of embodiments with reference to the accompanying drawings, in which.

DETAILED DESCRIPTION

Figure 1:
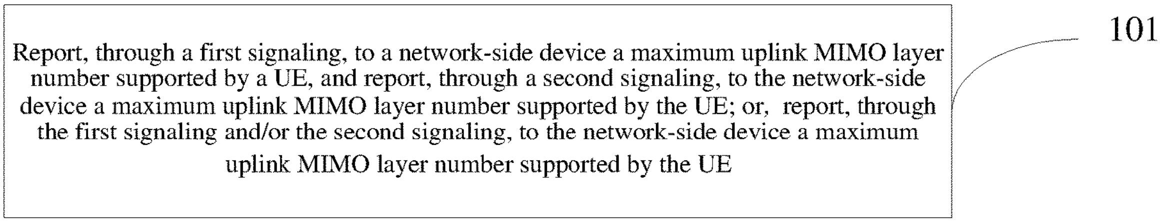
FIG. 1 is a schematic flowchart of a reporting method provided by an embodiment of the present disclosure.

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of the embodiments do not represent all implementations consistent with the embodiments of the present disclosure. Instead, they are merely examples of apparatuses and methods consistent with some aspects of embodiments of the present disclosure as recited in the appended claims.

The terms used in embodiments of the present disclosure are merely for the purpose of describing particular embodiments and are not intended to limit embodiments of the present disclosure. As used in embodiments of the present disclosure and the appended claims, the singular forms "a" and "the" are intended to include the plural forms as well, unless the context clearly indicates otherwise. It should also be understood that the term "and/or" as used herein refers to and includes any or all possible combinations of one or more of the associated listed items.

It should be understood that, although the terms first, second, third, etc. may be used in embodiments of the present disclosure to describe various information, such information should not be limited to these terms. These terms are only used to distinguish the same type of information from each other. For example, without departing from the scope of embodiments of the present disclosure, the first indication information may also be referred to as the second information, and similarly, the second information may also be referred to as the first information. Depending on the context, the word "if" as used herein can be interpreted as "upon" or "when" or "in response to determination".

As described above, in 5G communication networks, uplink performance needs to be further improved due to imbalance in throughput between uplink and downlink, where the uplink performance is generally improved by introducing uplink multiple-in multiple-out (MIMO) technologies.

The current existing signaling only supports that a User Equipment (UE) reports that it supports a maximum-1-layer uplink MIMO capability, a maximum-2-layer uplink MIMO capability, and a maximum-4-layer uplink MIMO capability. When the UE supports the maximum-1-layer uplink MIMO capability or the maximum-2-layer uplink MIMO capability, the imbalance in the throughput between the uplink and the downlink will still be caused. Moreover, due to implementation constraints of handheld UEs, it is not feasible to directly enable the UE to support the maximum-4-layer uplink MIMO capability. Based on this, UEs that support a maximum-3-layer uplink MIMO capability may be introduced first to improve the uplink performance of the handheld UEs. However, the existing signaling cannot be extended to support that the UE reports that it supports the maximum-3-layer uplink MIMO capability.

A reporting method and apparatus, a user equipment, a network device and a storage medium provided by embodiments of the present disclosure are described in detail below with reference to the accompanying drawings.

FIG. 1 is a schematic flowchart of a reporting method provided by an embodiment of the present disclosure. The method is performed by a UE. As shown in FIG. 1, the reporting method may include step 101.

In the step 101, a maximum uplink MIMO layer number supported by the UE is reported to a network device through a first signaling and/or a second signaling.

It should be noted the UE may refer to a device that provides speech and/or data connectivity for the user. The UE may communicate with one or more core networks via a Radio Access Network (RAN). The UE may be an Internet of Things terminal, such as a sensor device, a mobile phone (or a "cellular" phone), and a computer having an Internet of Things terminal, for example, a fixed, portable, pocket-sized, handheld, computer built-in or vehicle-mounted device. For example, it may be a station (STA), a subscriber unit, a subscriber station, a mobile station, a mobile, a remote station, an access point, a remote terminal, an access terminal, a user terminal, or a user agent. Alternatively, the UE may also be a device of an unmanned aerial vehicle. Alternatively, the UE may also be an in-vehicle device, for example, a trip computer with a wireless communication function, or a wireless terminal external to the trip computer. Alternatively, the UE may also be a roadside device, for example, a street light, a signal light, or other roadside device with a wireless communication function, etc.

In an embodiment of the present disclosure, the second signaling may be the current existing signaling, and the first signaling may be a new signaling obtained by extending the current existing signaling.

In an embodiment of the present disclosure, a number whose reporting is supported by the second signaling includes at least one of 1 layer, 2 layers and 4 layers.

In an embodiment of the present disclosure, the first signaling may only support reporting of a layer number that the second signaling cannot report. For example, a number whose reporting can be supported by the first signaling is only: 3 layers.

In another embodiment of the present disclosure, the first signaling may support the reporting of the layer number that the second signaling cannot report and reporting of the layer number that the second signaling can report. For example, the number whose reporting can be supported by the first signaling is: 1 layer, 2 layers, 3 layers and 4 layers.

Further, in an embodiment of the present disclosure, the maximum uplink MIMO layer number reported through the first signaling and the maximum uplink MIMO layer number reported through the second signaling may be the same. In another embodiment of the present disclosure, the maximum uplink MIMO layer number reported through the first signaling and the maximum uplink MIMO layer number reported through the second signaling may be different.

In addition, regarding "in which case the maximum uplink MIMO layer number reported through the first signaling and the maximum uplink MIMO layer number reported through the second signaling are the same or different", detailed introduction will be given in subsequent embodiments.

To sum up, in the reporting method provided by embodiments of the present disclosure, the UE will report, through the first signaling, to the network device the maximum uplink MIMO layer number supported by it, and/or, report, through the second signaling, to the network device the maximum uplink MIMO layer number supported by it. The maximum uplink MIMO layer number reported through the first signaling is the same as or different from the maximum uplink MIMO layer number reported through the second signaling. Specifically, in embodiments of the present disclosure, when the maximum uplink MIMO layer number supported by the UE is 3, it may be reported to the network device through the first signaling. That is, in embodiments of the present disclosure, the first signaling can support the UE to report that it supports the maximum-3-layer uplink MIMO capability, thereby improving the uplink performance of the UE without breaking the implementation constraints of the UE.

Figure 2:
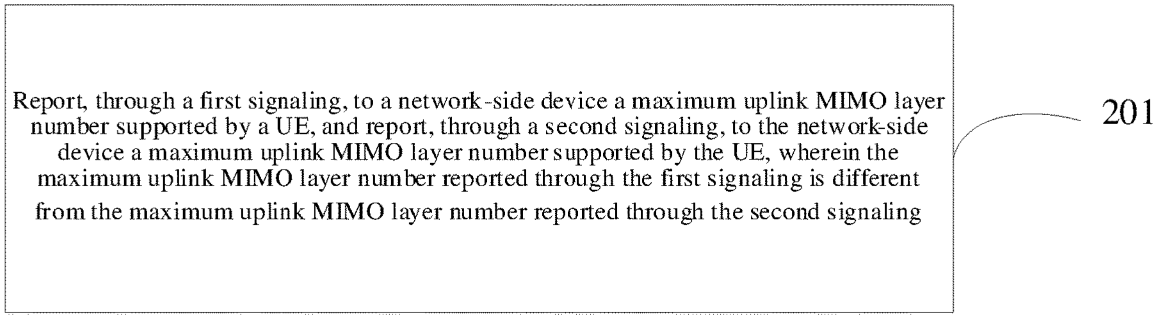
FIG. 2 is a schematic flowchart of a reporting method provided by an embodiment of the present disclosure.

FIG. 2 is a schematic flowchart of a reporting method provided by an embodiment of the present disclosure. The method is performed by a UE. As shown in FIG. 2, the reporting method may include step 201.

In the step 201, a maximum uplink MIMO layer number supported by the UE is reported to a network device through a first signaling, and a maximum uplink MIMO layer number supported by the UE is reported to the network device through a second signaling, the maximum uplink MIMO layer number reported through the first signaling is different from the maximum uplink MIMO layer number reported through the second signaling.

It should be noted that in an embodiment of the present disclosure, when a first maximum uplink MIMO layer number supported by the UE will be reported to the network device, and the first maximum uplink MIMO layer number is a number whose reporting is not supported by the second signaling, the first maximum uplink MIMO layer number may be reported to the network device through the first signaling, and a second maximum uplink MIMO layer number supported by the UE may be reported to the network device through the second signaling. The second maximum uplink MIMO layer number is a maximum number, among numbers whose reporting is supported by the second signaling, which is smaller than the first maximum uplink MIMO layer number.

For example, in an embodiment of the present disclosure, it is assumed that the UE will report to the network device that the maximum uplink MIMO layer number supported by the UE is 3. Since the second signaling only supports reporting of 1 layer, 2 layers and 4 layers, and 3 layers is a layer number whose reporting is not supported by the second signaling. Therefore, the network device UE may report, through the first signaling, to the network device that the maximum uplink MIMO layer number supported by the UE is 3, and report, through the second signaling, to the network device that the maximum uplink MIMO layer number supported by the UE is 2.

It should be noted that in an embodiment of the present disclosure, in a case that the maximum uplink MIMO layer number reported through the first signaling is different from the maximum uplink MIMO layer number reported through the second signaling, if the network device can only identify the second signaling but cannot identify the first signaling, the network device may ignore the first signaling after receiving the first signaling and the second signaling, only identify the second signaling to acquire the second maximum uplink MIMO layer number, and configure a MIMO layer number for the UE based on the second maximum uplink MIMO layer number. For example, the network device may configure for the UE a MIMO layer number that is less than or equal to the second maximum uplink MIMO layer number.

In another embodiment of the present disclosure, in the case that the maximum uplink MIMO layer number reported through the first signaling is different from the maximum uplink MIMO layer number reported through the second signaling, if the network device can identify the first signaling, then in this case, regardless of whether the network device can identify the second signaling, after receiving the first signaling and the second signaling, the network device will ignore the second signaling and only identify the first signaling to acquire the first maximum uplink MIMO layer number, and configure a MIMO layer number for the UE based on the first maximum uplink MIMO layer number. For example, the network device may configure for the UE a MIMO layer number that is less than or equal to the first maximum uplink MIMO layer number.

To sum up, in the reporting method provided by embodiments of the present disclosure, the UE will report, through the first signaling, to the network device the maximum uplink MIMO layer number supported by it, and/or, report, through the second signaling, to the network device the maximum uplink MIMO layer number supported by it. The maximum uplink MIMO layer number reported through the first signaling is the same as or different from the maximum uplink MIMO layer number reported through the second signaling. Specifically, in embodiments of the present disclosure, when the maximum uplink MIMO layer number supported by the UE is 3, it may be reported to the network device through the first signaling. That is, in embodiments of the present disclosure, the first signaling can support the UE to report that it supports the maximum-3-layer uplink MIMO capability, thereby improving the uplink performance of the UE without breaking the implementation constraints of the UE.

Figure 3:
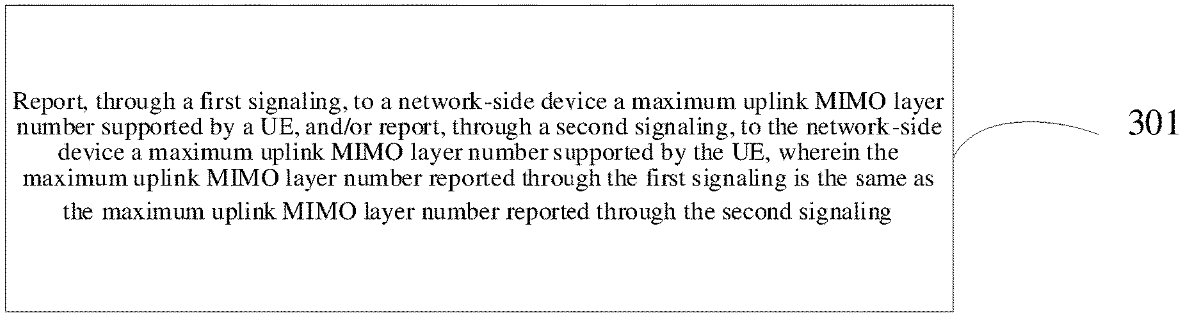
FIG. 3 is a schematic flowchart of a reporting method provided by an embodiment of the present disclosure.

FIG. 3 is a schematic flowchart of a reporting method provided by an embodiment of the present disclosure. The method is performed by a UE. As shown in FIG. 3, the reporting method may include step 301.

In the step 301, a maximum uplink MIMO layer number supported by the UE is reported to a network device through a first signaling, and/or, a maximum uplink MIMO layer number supported by the UE is reported to the network device through a second signaling, and the maximum uplink MIMO layer number reported through the first signaling is the same as the maximum uplink MIMO layer number reported through the second signaling.

It should be noted that in an embodiment of the present disclosure, both the first signaling and the second signaling can be reported to the network device, and the maximum uplink MIMO layer number reported through the first signaling is the same as the maximum uplink MIMO layer number reported through the second signaling. That is, a third maximum uplink MIMO layer number is reported to the network device through the first signaling, and the third maximum uplink MIMO layer is reported to the network device through the second signaling. The third maximum uplink MIMO layer number is a number whose reporting is supported by the second signaling.

In an embodiment of the present disclosure, in a case that the maximum uplink MIMO layer number reported through the first signaling is the same as the maximum uplink MIMO layer number reported through the second signaling, if the network device can only identify the second signaling but cannot identify the first signaling, the network device may ignore the first signaling after receiving the first signaling and the second signaling, only identify the second signaling to acquire the third maximum uplink MIMO layer number, and configure a MIMO layer number for the UE based on the third maximum uplink MIMO layer number. For example, the network device may configure for the UE a MIMO layer number that is less than or equal to the third maximum uplink MIMO layer number.

In another embodiment of the present disclosure, in the case that the maximum uplink MIMO layer number reported through the first signaling is the same as the maximum uplink MIMO layer number reported through the second signaling, if the network device can identify the first signaling, then in this case, regardless of whether the network device can identify the second signaling, after receiving the first signaling and the second signaling, the network device will ignore the second signaling and only identify the first signaling to acquire the third maximum uplink MIMO layer number, and configure a MIMO layer number for the UE based on the third maximum uplink MIMO layer number. For example, the network device may configure for the UE a MIMO layer number that is less than or equal to the third maximum uplink MIMO layer number.

In another embodiment of the present disclosure, only the second signaling may be reported to the network device, and the second signaling includes the third maximum uplink MIMO layer number.

Based on this, in an embodiment of the present disclosure, when the UE only reports the second signaling to the network device, after receiving the second signaling, the network device may directly identify the second signaling to obtain the third maximum uplink MIMO layer number, and configure the MIMO layer number for the UE based on the third maximum uplink MIMO layer number. For example, the network device may configure for the UE the MIMO layer number that is less than or equal to the third maximum uplink MIMO layer number.

To sum up, in the reporting method provided by embodiments of the present disclosure, the UE will report, through the first signaling, to the network device the maximum uplink MIMO layer number supported by it, and/or, report, through the second signaling, to the network device the maximum uplink MIMO layer number supported by it. The maximum uplink MIMO layer number reported through the first signaling is the same as or different from the maximum uplink MIMO layer number reported through the second signaling. Specifically, in embodiments of the present disclosure, when the maximum uplink MIMO layer number supported by the UE is 3, it may be reported to the network device through the first signaling. That is, in embodiments of the present disclosure, the first signaling can support the UE to report that it supports the maximum-3-layer uplink MIMO capability, thereby improving the uplink performance of the UE without breaking the implementation constraints of the UE.

Figure 4:
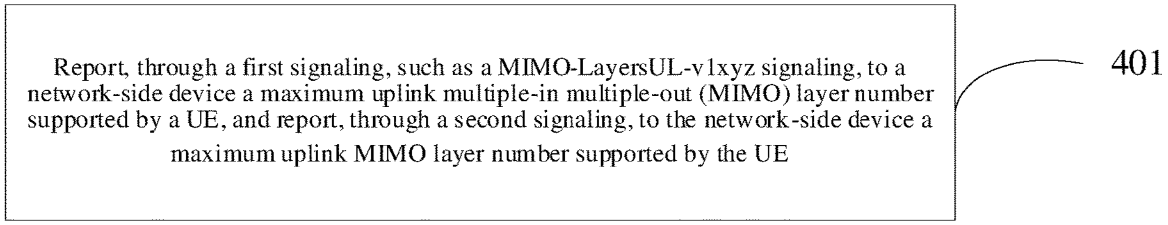
FIG. 4 is a schematic flowchart of a reporting method provided by an embodiment of the present disclosure.

FIG. 4 is a schematic flowchart of a reporting method provided by an embodiment of the present disclosure. The method is performed by a UE. As shown in FIG. 4, the reporting method may include step 401.

In the step 401, a maximum uplink MIMO layer number supported by the UE is reported to a network device through a first signaling, such as a MIMO-LayersUL-v1xyz signaling, and a maximum uplink MIMO layer number supported by the UE is reported to the network device through a second signaling, such as a MIMO-LayersUL signaling.

In an embodiment of the present disclosure, the second signaling is the MIMO-LayersUL signaling, the first signaling is the MIMO-LayersUL-v1xyz signaling, and the first signaling, such as the MIMO-LayersUL-v1xyz signaling, is obtained by extending the second signaling, such as the MIMO-LayersUL signaling, so that the MIMO-LayersUL-v1xyz signaling has a capability to report that the UE supports the maximum MIMO layer number of 3 layers.

In an embodiment of the present disclosure, the following first piece of code may be used to extend the MIMO-LayersUL signaling.

```
FeatureSets ::=   SEQUENCE {
   [[
   featureSetsUplinkPerCC-v1xyz   SEQUENCE (SIZE (1..maxPerCC-
FeatureSets)) OF FeatureSetUplinkPerCC-v1xyz   OPTIONAL
]]
}
FeatureSetUplinkPerCC-v1xyz ::=   SEQUENCE {
   mimo-CB-PUSCH-v1xyz   SEQUENCE {
      maxNumberMIMO-LayersCB-PUSCH-v1xyz   MIMO-LayersUL-
v1xyz   OPTIONAL,
      maxNumberSRS-ResourcePerSet-v1xyz   INTEGER (1..3)
   }
OPTIONAL,
   maxNumberMIMO-LayersNonCB-PUSCH-v1xyz
   MIMO-LayersUL-v1xyz
OPTIONAL,
}
MIMO-LayersUL-v1xyz ::=   ENUMERATED { three Layers}
```

It can be seen from the above first piece of code that in an embodiment of the present disclosure, the second signaling, such as the MIMO-LayersUL signaling, may be extended as the first signaling, such as the MIMO-LayersUL-v1xyz signaling, enabling the first signaling, such as the MIMO-LayersUL-v1xyz signaling to only support the reporting of the uplink MIMO layer number of 3 layers.

In another embodiment of the present disclosure, the following second piece of code may be used to extend the MIMO-LayersUL signaling.

```
FeatureSets ::=   SEQUENCE {
   [[
   featureSetsUplinkPerCC-v1xyz   SEQUENCE (SIZE (1..maxPerCC-
FeatureSets)) OF FeatureSetUplinkPerCC-v1xyz   OPTIONAL
]]
}
FeatureSetUplinkPerCC-v17xy ::=   SEQUENCE {
FeatureSetUplinkPerCC-v1xyz ::=   SEQUENCE {
   mimo-CB-PUSCH-v1xyz   SEQUENCE {
      maxNumberMIMO-LayersCB-PUSCH-v1xyz   MIMO-LayersUL-
v1xyz   OPTIONAL,
      maxNumberSRS-ResourcePerSet-v1xyz   INTEGER (1..3)
   }
OPTIONAL,
   maxNumberMIMO-LayersNonCB-PUSCH-v1xyz
   MIMO-LayersUL-v1xyz
OPTIONAL,
}
MIMO-LayersUL-v17xy ::=   ENUMERATED { one layer, two layers,
three Layers, four layers}
```

It can be seen from the above second piece of code that in an embodiment of the present disclosure, the second signaling, such as the MIMO-LayersUL signaling, may be extended as the first signaling, such as the MIMO-LayersUL-v1xyz signaling, enabling the first signaling, such as the MIMO-LayersUL-v1xyz signaling, to support the reporting of the uplink MIMO layer number of 1 layer, 2 layers, 3 layers and 4 layers.

In addition, it should be noted that in an embodiment of the present disclosure, an architecture between the signalings is mainly that: a FeatureSets signaling includes a featureSetsUplinkPerCC signaling, and a featureSetsUplinkPerCC signaling includes a mimo-CB-PUSCH signaling and a maxNumberMIMO-LayersNonCB-PUSCH signaling, where the mimo-CB-PUSCH signaling further includes a maxNumberMIMO-LayersCB-PUSCH signaling and a maxNumberSRS-ResourcePerSet signaling. In addition, the maxNumberMIMO-LayersCB-PUSCH signaling and the maxNumberMIMO-LayersNonCB-PUSCH signaling are both configured by calling the MIMO-LayersUL-v1xyz signaling.

That is, a signaling set related to the MIMO-LayersUL signaling includes: the featureSetsUplinkPerCC signaling, the mimo-CB-PUSCH signaling, the maxNumberMIMO-LayersCB-PUSCH signaling, the maxNumberSRS-ResourcePerSet signaling, and the maxNumberMIMO-LayersNonCB-PUSCH signaling.

Based on this, in an embodiment of the present disclosure, when the second signaling, such as the MIMO-LayersUL signaling, is to be extended, a signaling in a signaling set related to the second signaling also needs to be similarly extended. Specifically, the same extension needs to be made to the featureSetsUplinkPerCC signaling, the mimo-CB-PUSCH signaling, the maxNumberMIMO-LayersCB-PUSCH signaling, the maxNumberSRS-ResourcePerSet signaling, and the maxNumberMIMO-LayersNonCB-PUSCH signaling.

In an embodiment of the present disclosure, when the second signaling, such as the MIMO-LayersUL signaling, is extended as the first signaling, such as the MIMO-LayersUL-v1xyz signaling, it is also necessary to extend the featureSetsUplinkPerCC signaling as the featureSetsUplinkPerCC-v1xyz signaling, extend the mimo-CB-PUSCH signaling as the mimo-CB-PUSCH-v1xyz signaling, extend the maxNumberMIMO-LayersCB-PUSCH signaling as the maxNumberMIMO-LayersCB-PUSCH-v1xyz signaling, extend the maxNumberSRS-ResourcePerSet signaling as the rmaxNumberSRS-ResourcePerSet-v1xyz signaling, and extend the maxNumberMIMO-LayersNonCB-PUSCH signaling as the maxNumberMIMO-LayersNonCB-PUSCH-v1xyz signaling.

Moreover, in an embodiment of the present disclosure, an entry corresponding to the extended signaling (i.e., the first signaling (the MIMO-LayersUL-v1xyz signaling)) corresponding to the MIMO-LayersUL signaling should be the same as or consistent with an entry corresponding to the extended signaling corresponding to another signaling.

For example, if the featureSetsUplinkPerCC signaling is extended and named featureSetsUplinkPerCC-v1810, all signalings included in the featureSetsUplinkPerCC signaling need to be named after v1810. That is, the mimo-CB-PUSCH signaling is extended and named mimo-CB-PUSCH-v1810, the maxNumberMIMO-LayersCB-PUSCH signaling is extended and named maxNumberMIMO-LayersCB-PUSCH-v1810, the maxNumberSRS-ResourcePerSet signaling is extended and named maxNumberSRS-ResourcePerSet-v1810, the maxNumberMIMO-LayersNonCB-PUSCH signaling is extended and named maxNumberMIMO-LayersNonCB-PUSCH-v1810, and the MIMO-LayersUL signaling is extended and named MIMO-LayersUL-v1810.

In addition, it should be noted that the above embodiments only take "reporting, through the first signaling, such as the MIMO-LayersUL-v1xyz signaling, to the network device the maximum uplink MIMO layer number supported by the UE, and reporting, through the second signaling, such as the MIMO-LayersUL signaling, to the network device the maximum uplink MIMO layer number supported by the UE" as an example for illustration. Alternatively, in another embodiment of the present disclosure, the maximum uplink MIMO layer number supported by the UE may also be reported to the network device through the first signaling, such as the MIMO-LayersUL-v1xyz signaling, and the maximum uplink MIMO layer number supported by the UE is reported to the network device through the featureSetsUplinkPerCC signaling.

It should also be noted that in an embodiment of the present disclosure, the mimo-CB-PUSCH-v1xyz signaling, the maxNumberMIMO-LayersCB-PUSCH-v1xyz signaling, the maxNumberSRS-ResourcePerSet-v1xyz signaling, and the maxNumberMIMO-LayersNonCB-PUSCH-v1xyz signaling may also be used as the first signaling in embodiments of the present disclosure.

To sum up, in the reporting method provided by embodiments of the present disclosure, the UE will report, through the first signaling, to the network device the maximum uplink MIMO layer number supported by it, and/or, report, through the second signaling, to the network device the maximum uplink MIMO layer number supported by it. The maximum uplink MIMO layer number reported through the first signaling is the same as or different from the maximum uplink MIMO layer number reported through the second signaling. Specifically, in embodiments of the present disclosure, when the maximum uplink MIMO layer number supported by the UE is 3, it may be reported to the network device through the first signaling. That is, in embodiments of the present disclosure, the first signaling can support the UE to report that it supports the maximum-3-layer uplink MIMO capability, thereby improving the uplink performance of the UE without breaking the implementation constraints of the UE.

Figure 5:
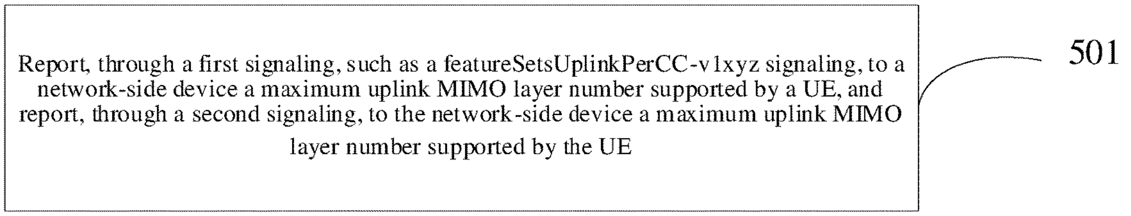
FIG. 5 is a schematic flowchart of a reporting method provided by an embodiment of the present disclosure.

FIG. 5 is a schematic flowchart of a reporting method provided by an embodiment of the present disclosure. The method is performed by a UE. As shown in FIG. 5, the reporting method may include step 501.

In the step 501, a maximum uplink MIMO layer number supported by the UE is reported to a network device through a first signaling, such as a featureSetsUplinkPerCC-v1xyz signaling, and a maximum uplink MIMO layer number supported by the UE is reported to the network device through a second signaling, such as a featureSetsUplinkPerCC signaling.

In an embodiment of the present disclosure, the second signaling is the featureSetsUplinkPerCC signaling, the first signaling is the featureSetsUplinkPerCC-v1xyz signaling, and the second signaling, such as the featureSetsUplinkPerCC signaling, is extended to obtain the first signaling, such as the featureSetsUplinkPerCC-v1xyz signaling, enabling the first signaling, such as the featureSetsUplinkPerCC-v1xyz signaling, to have the capability to report that the UE supports the maximum uplink MIMO layer number of 3 layers.

For the introduction and the code related to the extension of the second signaling, such as the featureSetsUplinkPerCC signaling, reference may be made to the above embodiments, which will not be described again here in embodiments of the present disclosure.

In addition, it should be noted that in an embodiment of the present disclosure, an architecture between the signalings is mainly that: a FeatureSets signaling includes a featureSetsUplinkPerCC signaling, and a featureSetsUplinkPerCC signaling includes a mimo-CB-PUSCH signaling and a maxNumberMIMO-LayersNonCB-PUSCH signaling, where the mimo-CB-PUSCH signaling further includes a maxNumberMIMO-LayersCB-PUSCH signaling and a maxNumberSRS-ResourcePerSet signaling. In addition, the maxNumberMIMO-LayersCB-PUSCH signaling and the maxNumberMIMO-LayersNonCB-PUSCH signaling are both configured by calling the MIMO-LayersUL-v1xyz signaling.

That is, a signaling set related to the featureSetsUplinkPerCC signaling includes: a MIMO-LayersUL signaling, a mimo-CB-PUSCH signaling, a maxNumberMIMO-LayersCB-PUSCH signaling, a maxNumberSRS-ResourcePerSet signaling, and a maxNumberMIMO-LayersNonCB-PUSCH signaling.

Based on this, in an embodiment of the present disclosure, when the second signaling, such as the featureSetsUplinkPerCC signaling, is to be extended, a signaling in a signaling set related to the second signaling also needs to be similarly extended. Specifically, the same extension needs to be made to the MIMO-LayersUL signaling, the mimo-CB-PUSCH signaling, the maxNumberMIMO-LayersCB-PUSCH signaling, the maxNumberSRS-ResourcePerSet signaling, and the maxNumberMIMO-LayersNonCB-PUSCH signaling.

Then, in an embodiment of the present disclosure, when the second signaling, such as the featureSetsUplinkPerCC signaling, is extended as the first signaling, such as the featureSetsUplinkPerCC-v1xyz signaling, it is also necessary to extend the MIMO-LayersUL signaling to the MIMO-LayersUL-v1xyz signaling, extend the mimo-CB-PUSCH signaling as the mimo-CB-PUSCH-v1xyz signaling, extend the maxNumberMIMO-LayersCB-PUSCH signaling as the maxNumberMIMO-LayersCB-PUSCH-v1xyz signaling, extend the maxNumberSRS-ResourcePerSet signaling as the maxNumberSRS-ResourcePerSet-v1xyz signaling, extend the maxNumberMIMO-LayersNonCB-PUSCH signaling as the maxNumberMIMO-LayersNonCB-PUSCH-v1xyz signaling.

Moreover, in an embodiment of the present disclosure, an entry corresponding to the extended signaling (i.e., the first signaling (the featureSetsUplinkPerCC-v1xyz signaling)) corresponding to the featureSetsUplinkPerCC signaling should be consistent with or the same as an entry corresponding to the extended signaling corresponding to another signaling.

In addition, it should be noted that the above embodiments only take "reporting, through the first signaling, such as the featureSetsUplinkPerCC-v1xyz signaling, to the network device the maximum uplink MIMO layer number supported by the UE, and reporting, through the second signaling, such as the featureSetsUplinkPerCC signaling, to the network device the maximum uplink MIMO layer number supported by the UE" as an example for illustration. Alternatively, in another embodiment of the present disclosure, the maximum uplink MIMO layer number supported by the UE may also be reported to the network device through the first signaling, such as the featureSetsUplinkPerCC-v1xyz signaling, and the maximum uplink MIMO layer number supported by the UE is reported to the network device through the second signaling, such as the MIMO-LayersUL signaling.

It should also be noted that in an embodiment of the present disclosure, the mimo-CB-PUSCH-v1xyz signaling, the maxNumberMIMO-LayersCB-PUSCH-v1xyz signaling, the maxNumberSRS-ResourcePerSet-v1xyz signaling, and the maxNumberMIMO-LayersNonCB-PUSCH-v1xyz signaling may also be used as the first signaling in embodiments of the present disclosure.

To sum up, in the reporting method provided by embodiments of the present disclosure, the UE will report, through the first signaling, to the network device the maximum uplink MIMO layer number supported by it, and/or, report, through the second signaling, to the network device the maximum uplink MIMO layer number supported by it. The maximum uplink MIMO layer number reported through the first signaling is the same as or different from the maximum uplink MIMO layer number reported through the second signaling. Specifically, in embodiments of the present disclosure, when the maximum uplink MIMO layer number supported by the UE is 3, it may be reported to the network device through the first signaling. That is, in embodiments of the present disclosure, the first signaling can support the UE to report that it supports the maximum-3-layer uplink MIMO capability, thereby improving the uplink performance of the UE without breaking the implementation constraints of the UE.

Figure 6:
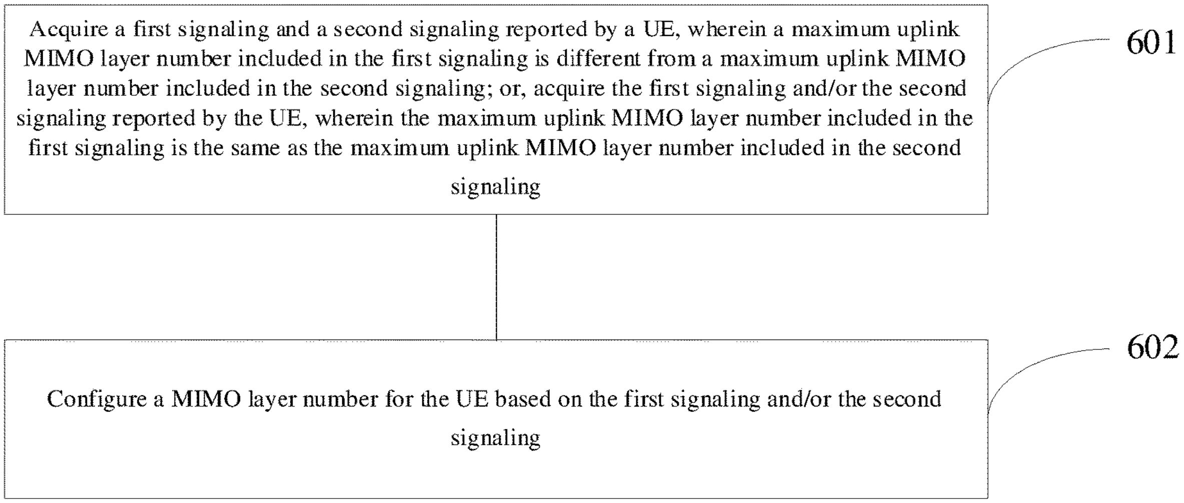
FIG. 6 is a schematic flowchart of a reporting method provided by an embodiment of the present disclosure.

FIG. 6 is a schematic flowchart of a reporting method provided by an embodiment of the present disclosure. The method is performed by a base station. As shown in FIG. 6, the reporting method may include steps 601 and 602.

In the step 601, a first signaling and a second signaling reported by a UE are acquired, the first signaling includes a maximum uplink MIMO layer number supported by the UE, the second signaling includes a maximum uplink MIMO layer number supported by the UE, and the maximum uplink MIMO layer number included in the first signaling is different from the maximum uplink MIMO layer number included in the second signaling; or the first signaling and/or the second signaling reported by the UE are acquired, and the maximum uplink MIMO layer number included in the first signaling is the same as the maximum uplink MIMO layer number included in the second signaling.

In the step 602, a MIMO layer number is configured for the UE based on the first signaling and/or the second signaling.

For the relevant introduction to the steps 601-602, reference may be made to the description in the foregoing embodiments, which will not be described again here in embodiments of the present disclosure.

To sum up, in the reporting method provided by embodiments of the present disclosure, the UE will report, through the first signaling, to the network device the maximum uplink MIMO layer number supported by it, and/or, report, through the second signaling, to the network device the maximum uplink MIMO layer number supported by it. The maximum uplink MIMO layer number reported through the first signaling is the same as or different from the maximum uplink MIMO layer number reported through the second signaling. Specifically, in embodiments of the present disclosure, when the maximum uplink MIMO layer number supported by the UE is 3, it may be reported to the network device through the first signaling. That is, in embodiments of the present disclosure, the first signaling can support the UE to report that it supports the maximum-3-layer uplink MIMO capability, thereby improving the uplink performance of the UE without breaking the implementation constraints of the UE.

Figure 7:
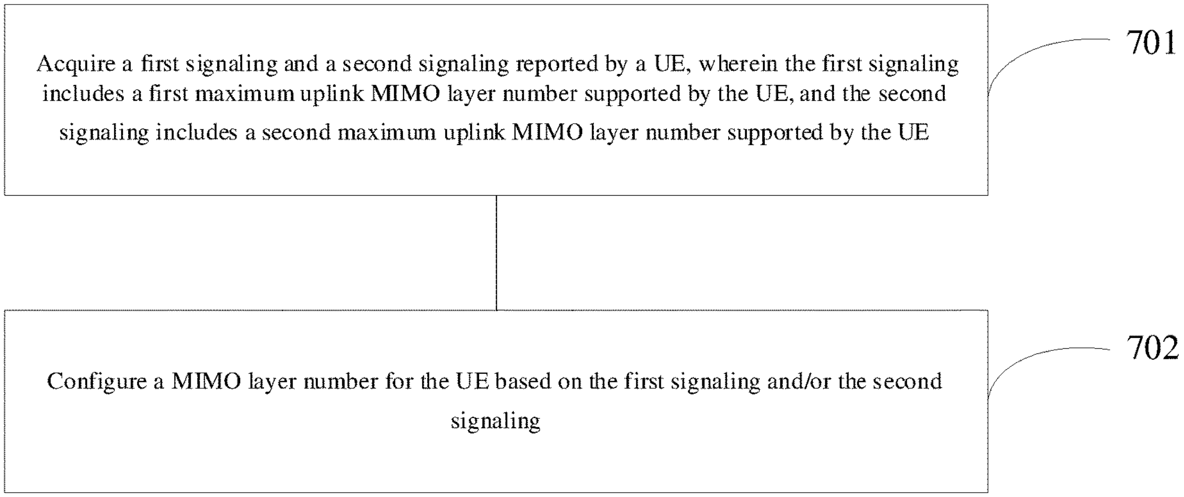
FIG. 7 is a schematic flowchart of a reporting method provided by an embodiment of the present disclosure.

FIG. 7 is a schematic flowchart of a reporting method provided by an embodiment of the present disclosure. The method is performed by a base station. As shown in FIG. 7, the reporting method may include steps 701 and 702.

In the step 701, a first signaling and a second signaling reported by a UE are acquired, the first signaling includes a first maximum uplink MIMO layer number supported by the UE, and the second signaling includes a second maximum uplink MIMO layer number supported by the UE.

In an embodiment of the present disclosure, the first maximum uplink MIMO layer number is a number whose reporting is not supported by the second signaling, and the second maximum uplink MIMO layer number is a maximum number, among numbers whose reporting is supported by the second signaling, which is smaller than the first maximum uplink MIMO layer number.

In the step 702, a MIMO layer number is configured for the UE based on the first signaling and/or the second signaling.

In an embodiment of the present disclosure, when the network device does not have a capability to identify the first signaling, the network device ignores the first signaling and identifies the second signaling to acquire the second maximum uplink MIMO layer number, and configures a MIMO layer number for the UE based on the second maximum uplink MIMO layer number.

In another embodiment of the present disclosure, when the network device has the capability to identify the first signaling, the network device ignores the second signaling and identifies the first signaling to acquire the first maximum uplink MIMO layer number, and configure a MIMO layer number for the UE based on the first maximum uplink MIMO layer number.

For other detailed introduction to the steps 701-702, reference may be made to the description in the foregoing embodiments, which will not be described again here in embodiments of the present disclosure.

To sum up, in the reporting method provided by embodiments of the present disclosure, the UE will report, through the first signaling, to the network device the maximum uplink MIMO layer number supported by it, and/or, report, through the second signaling, to the network device the maximum uplink MIMO layer number supported by it. The maximum uplink MIMO layer number reported through the first signaling is the same as or different from the maximum uplink MIMO layer number reported through the second signaling. Specifically, in embodiments of the present disclosure, when the maximum uplink MIMO layer number supported by the UE is 3, it may be reported to the network device through the first signaling. That is, in embodiments of the present disclosure, the first signaling can support the UE to report that it supports the maximum-3-layer uplink MIMO capability, thereby improving the uplink performance of the UE without breaking the implementation constraints of the UE.

Figure 8:
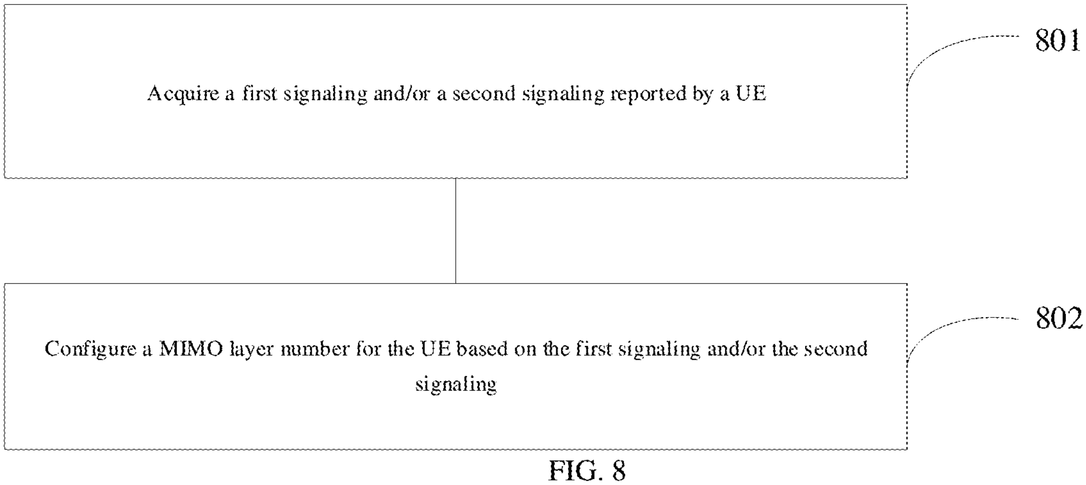
FIG. 8 is a schematic flowchart of a reporting method provided by an embodiment of the present disclosure.

FIG. 8 is a schematic flowchart of a reporting method provided by an embodiment of the present disclosure. The method is performed by a base station. As shown in FIG. 8, the reporting method may include steps 801 and 802.

In the step 801, a first signaling and/or a second signaling reported by the UE are acquired.

In an embodiment of the present disclosure, the network device may obtain the first signaling and the second signaling reported by the UE. The first signaling and the second signaling both include a third maximum uplink MIMO layer number supported by the UE. The third maximum uplink MIMO layer number is a number whose reporting is supported by the second signaling.

In another embodiment of the present disclosure, the network device may only acquire the second signaling reported by the UE, and the second signaling includes the third maximum uplink MIMO layer number supported by the UE.

In the step 802, a MIMO layer number is configured for the UE based on the first signaling and/or the second signaling.

In an embodiment of the present disclosure, when the network device does not have a capability to identify the first signaling, the network device ignores the first signaling and identifies the second signaling to acquire the second maximum uplink MIMO layer number, and configures a MIMO layer number for the UE based on the second maximum uplink MIMO layer number.

In another embodiment of the present disclosure, when the network device has the capability to identify the first signaling, the network device ignores the second signaling and identifies the first signaling to acquire the first maximum uplink MIMO layer number, and configure a MIMO layer number for the UE based on the first maximum uplink MIMO layer number.

For other detailed introduction to the steps 801-802, reference may be made to the description in the foregoing embodiments, which will not be described again here in embodiments of the present disclosure.

To sum up, in the reporting method provided by embodiments of the present disclosure, the UE will report, through the first signaling, to the network device the maximum uplink MIMO layer number supported by it, and/or, report, through the second signaling, to the network device the maximum uplink MIMO layer number supported by it. The maximum uplink MIMO layer number reported through the first signaling is the same as or different from the maximum uplink MIMO layer number reported through the second signaling. Specifically, in embodiments of the present disclosure, when the maximum uplink MIMO layer number supported by the UE is 3, it may be reported to the network device through the first signaling. That is, in embodiments of the present disclosure, the first signaling can support the UE to report that it supports the maximum-3-layer uplink MIMO capability, thereby improving the uplink performance of the UE without breaking the implementation constraints of the UE.

Figure 9:
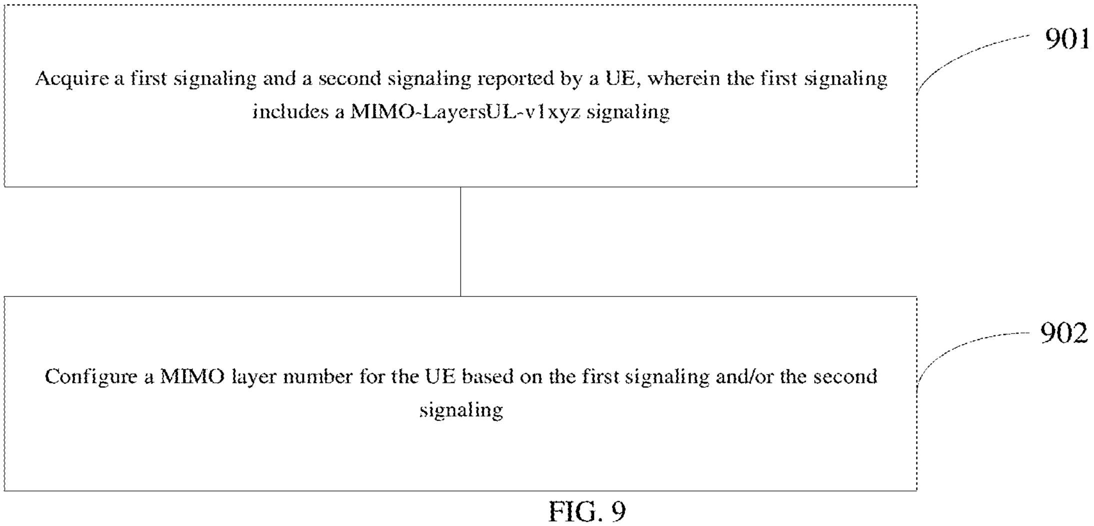
FIG. 9 is a schematic flowchart of a reporting method provided by an embodiment of the present disclosure.

FIG. 9 is a schematic flowchart of a reporting method provided by an embodiment of the present disclosure. The method is performed by a base station. As shown in FIG. 9, the reporting method may include steps 901 and 902.

In the step 901, a first signaling and a second signaling reported by a UE are acquired, and the first signaling includes a MIMO-LayersUL-v1xyz signaling.

In the step 902, a MIMO layer number is configured for the UE based on the first signaling and/or the second signaling.

For the relevant introduction to the steps 901-902, reference may be made to the description in the foregoing embodiments, which will not be described again here in embodiments of the present disclosure.

To sum up, in the reporting method provided by embodiments of the present disclosure, the UE will report, through the first signaling, to the network device the maximum uplink MIMO layer number supported by it, and/or, report, through the second signaling, to the network device the maximum uplink MIMO layer number supported by it. The maximum uplink MIMO layer number reported through the first signaling is the same as or different from the maximum uplink MIMO layer number reported through the second signaling. Specifically, in embodiments of the present disclosure, when the maximum uplink MIMO layer number supported by the UE is 3, it may be reported to the network device through the first signaling. That is, in embodiments of the present disclosure, the first signaling can support the UE to report that it supports the maximum-3-layer uplink MIMO capability, thereby improving the uplink performance of the UE without breaking the implementation constraints of the UE.

Figure 10:
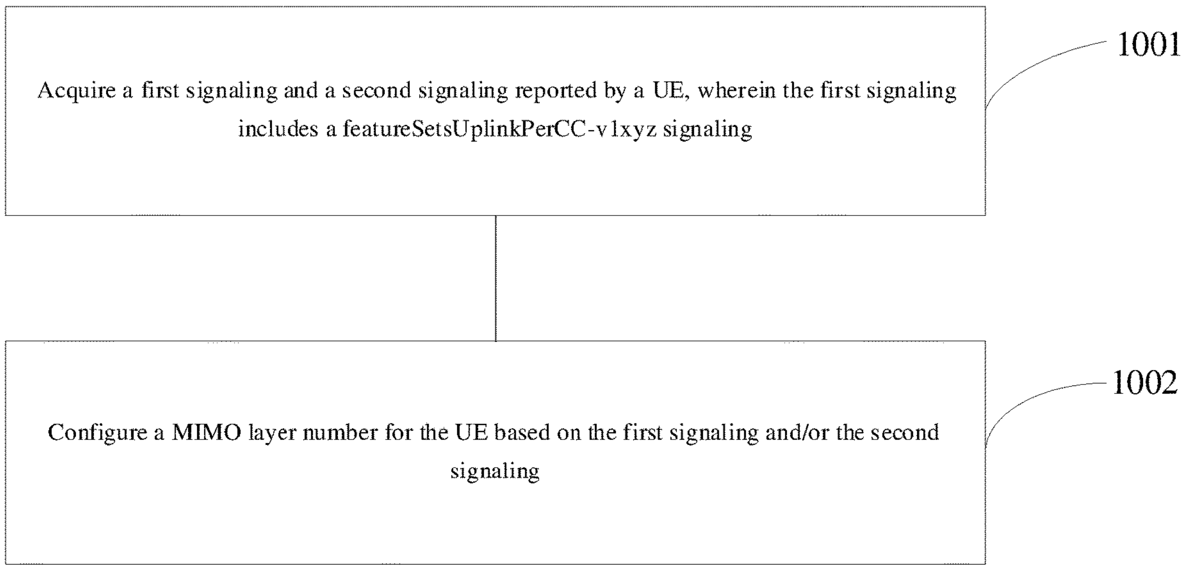
FIG. 10 is a schematic flowchart of a reporting method provided by an embodiment of the present disclosure.

FIG. 10 is a schematic flowchart of a reporting method provided by an embodiment of the present disclosure. The method is performed by a base station. As shown in FIG. 10, the reporting method may include steps 1001 and 1002.

In the step 1001, a first signaling and a second signaling reported by a UE are acquired, and the first signaling includes a featureSetsUplinkPerCC-v1xyz signaling.

In the step 1002, a MIMO layer number is configured for the UE based on the first signaling and/or the second signaling.

For the relevant introduction to the steps 1001-1002, reference may be made to the description in the foregoing embodiments, which will not be described again here in embodiments of the present disclosure.

To sum up, in the reporting method provided by embodiments of the present disclosure, the UE will report, through the first signaling, to the network device the maximum uplink MIMO layer number supported by it, and/or, report, through the second signaling, to the network device the maximum uplink MIMO layer number supported by it. The maximum uplink MIMO layer number reported through the first signaling is the same as or different from the maximum uplink MIMO layer number reported through the second signaling. Specifically, in embodiments of the present disclosure, when the maximum uplink MIMO layer number supported by the UE is 3, it may be reported to the network device through the first signaling. That is, in embodiments of the present disclosure, the first signaling can support the UE to report that it supports the maximum-3-layer uplink MIMO capability, thereby improving the uplink performance of the UE without breaking the implementation constraints of the UE.

Figure 11:
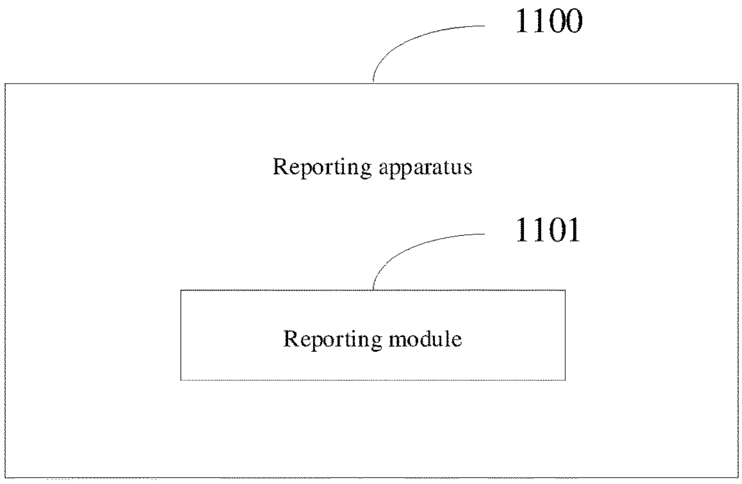
FIG. 11 is a schematic structural diagram of a reporting apparatus provided by an embodiment of the present disclosure.

FIG. 11 is a schematic structural diagram of a reporting apparatus 1100 provided by an embodiment of the present disclosure, which is applied to a UE. As shown in FIG. 11, the reporting apparatus 1100 may include:

a reporting module 1101, configured to report, through a first signaling, to a network device a maximum uplink Multiple-In Multiple-Out (MIMO) layer number supported by the UE, and report, through a second signaling, to the network device a maximum uplink MIMO layer number supported by the UE, and the maximum uplink MIMO layer number reported through the first signaling is different from the maximum uplink MIMO layer number reported through the second signaling; or report, through the first signaling and/or the second signaling, to the network device a maximum uplink MIMO layer number supported by the UE, and the maximum uplink MIMO layer number reported through the first signaling is the same as the maximum uplink MIMO layer number reported through the second signaling.

To sum up, in the reporting apparatus provided by embodiments of the present disclosure, the UE will report, through the first signaling, to the network device the maximum uplink MIMO layer number supported by it, and/or, report, through the second signaling, to the network device the maximum uplink MIMO layer number supported by it. The maximum uplink MIMO layer number reported through the first signaling is the same as or different from the maximum uplink MIMO layer number reported through the second signaling. Specifically, in embodiments of the present disclosure, when the maximum uplink MIMO layer number supported by the UE is 3, it may be reported to the network device through the first signaling. That is, in embodiments of the present disclosure, the first signaling can support the UE to report that it supports the maximum-3-layer uplink MIMO capability, thereby improving the uplink performance of the UE without breaking the implementation constraints of the UE.

In an embodiment of the present disclosure, the reporting module is further configured to:

report, through the first signaling, to the network device a first maximum uplink MIMO layer number, and report, through the second signaling, to the network device a second maximum uplink MIMO layer;

the first maximum uplink MIMO layer number is a number whose reporting is not supported by the second signaling, and the second maximum uplink MIMO layer number is a maximum number, among a number whose reporting is supported by the second signaling, which is smaller than the first maximum uplink MIMO layer number.

In an embodiment of the present disclosure, the reporting module is further configured to;

report, through the first signaling, to the network device a third maximum uplink MIMO layer number, and report, through the second signaling, to the network device the third maximum uplink MIMO layer number;

the third maximum uplink MIMO layer number is a number whose reporting is supported by the second signaling.

In an embodiment of the present disclosure, the reporting module is further configured to:

report, through the second signaling, to the network device, a third maximum uplink MIMO layer number;

the third maximum uplink MIMO layer number is a number whose reporting is supported by the second signaling.

In an embodiment of the present disclosure, a number whose reporting is supported by the second signaling includes at least one of 1 layer, 2 layers or 4 layers.

In an embodiment of the present disclosure, the first maximum uplink MIMO layer number is 3 layers.

In an embodiment of the present disclosure, the second maximum uplink MIMO layer number is 2 layers.

In an embodiment of the present disclosure, the first signaling includes a MIMO-LayersUL-v1xyz signaling.

In an embodiment of the present disclosure, a signaling set related to the first signaling includes at least one of a featureSetsUplinkPerCC-v1xyz signaling, a mimo-CB-PUSCH-v1xyz signaling, a maxNumberMIMO-LayersCB-PUSCH-v1xyz signaling, a maxNumberSRS-ResourcePerSet-v1xyz signaling, or a maxNumberMIMO-LayersNonCB-PUSCH-v1xyz signaling.

In an embodiment of the present disclosure, an entry corresponding to the MIMO-LayersUL-v1xyz signaling, an entry corresponding to the featureSetsUplinkPerCC-v1xyz signaling, an entry corresponding to the mimo-CB-PUSCH-v1xyz signaling, an entry corresponding to the maxNumberMIMO-LayersCB-PUSCH-v1xyz signaling, an entry corresponding to the maxNumberSRS-ResourcePerSet-v1xyz signaling and an entry corresponding to the maxNumberMIMO-LayersNonCB-PUSCH-v1xyz signaling are consistent.

Figure 12:
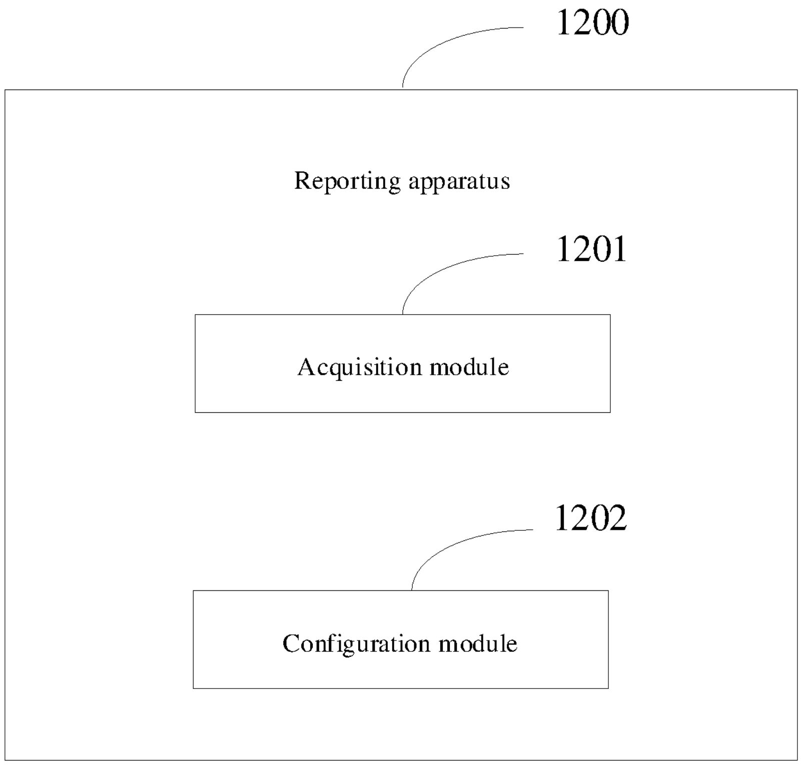
FIG. 12 is a schematic structural diagram of a reporting apparatus provided by an embodiment of the present disclosure.

FIG. 12 is a schematic structural diagram of a reporting apparatus 1200 provided by an embodiment of the present disclosure, which is applied to a network device. As shown in FIG. 12, the reporting apparatus 1200 may include:

an acquisition module 1201, configured to acquire a first signaling and a second signaling reported by a UE, and the first signaling includes a maximum uplink MIMO layer number supported by the UE, the second signaling includes a maximum uplink MIMO layer number supported by the UE, and the maximum uplink MIMO layer number included in the first signaling is different from the maximum uplink MIMO layer number included in the second signaling; or acquire the first signaling and/or the second signaling reported by the UE, and the maximum uplink MIMO layer number included in the first signaling is the same as the maximum uplink MIMO layer number included in the second signaling; and a configuration module 1202, configured to configure a MIMO layer number for the UE based on the first signaling and/or the second signaling.

To sum up, in the reporting apparatus provided by embodiments of the present disclosure, the UE will report, through the first signaling, to the network device the maximum uplink MIMO layer number supported by it, and/or, report, through the second signaling, to the network device the maximum uplink MIMO layer number supported by it. The maximum uplink MIMO layer number reported through the first signaling is the same as or different from the maximum uplink MIMO layer number reported through the second signaling. Specifically, in embodiments of the present disclosure, when the maximum uplink MIMO layer number supported by the UE is 3, it may be reported to the network device through the first signaling. That is, in embodiments of the present disclosure, the first signaling can support the UE to report that it supports the maximum-3-layer uplink MIMO capability, thereby improving the uplink performance of the UE without breaking the implementation constraints of the UE.

In an embodiment of the present disclosure, the maximum uplink MIMO layer number included in the first signaling is different from the maximum uplink MIMO layer number included in the second signaling; and the first signaling includes a first maximum uplink MIMO layer number supported by the UE, and the second signaling includes a second maximum uplink MIMO layer number supported by the UE; and the first maximum uplink MIMO layer number is a number whose reporting is not supported by the second signaling, and the second maximum uplink MIMO layer number is a maximum number, among a number whose reporting is supported by the second signaling, which is smaller than the first maximum uplink MIMO layer number.

In an embodiment of the present disclosure, the configuration module is further configured to:

when the network device is not equipped with a capability to identify the first signaling, ignore the first signaling, identify the second signaling to acquire the second maximum uplink MIMO layer number, and configure the MIMO layer number for the UE based on the second maximum uplink MIMO layer number; and when the network device is equipped with the capability to identify the first signaling, ignore the second signaling, identify the first signaling to acquire the first maximum uplink MIMO layer number, and configure the MIMO layer number for the UE based on the first maximum uplink MIMO layer number.

In an embodiment of the present disclosure, the acquisition module is further configured to:

acquire the first signaling and the second signaling reported by the UE, the first signaling and the second signaling both include a third maximum uplink MIMO layer number supported by the UE, and the third maximum uplink MIMO layer number is a number whose reporting is supported by the second signaling.

In an embodiment of the present disclosure, the configuration module is further configured to:

when the network device is not equipped with a capability to identify the first signaling, ignore the first signaling, identify the second signaling to acquire the third maximum uplink MIMO layer number, and configure the MIMO layer number for the UE based on the third maximum uplink MIMO layer number; and when the network device is equipped with the capability to identify the first signaling, ignore the second signaling, identify the first signaling to acquire the third maximum uplink MIMO layer number, and configure the MIMO layer number for the UE based on the third maximum uplink MIMO layer number.

In an embodiment of the present disclosure, the acquisition module is further configured to:

acquire the second signaling reported by the UE, and the second signaling includes a third maximum uplink MIMO layer number supported by the UE.

In an embodiment of the present disclosure, the configuration module is further configured to:

identify the second signaling to obtain the third maximum uplink MIMO layer number, and configure the MIMO layer number for the UE based on the third maximum uplink MIMO layer number.

In an embodiment of the present disclosure, a number whose reporting is supported by the second signaling includes at least one of 1 layer, 2 layers or 4 layers.

In an embodiment of the present disclosure, the first maximum uplink MIMO layer number is 3 layers.

In an embodiment of the present disclosure, the second maximum uplink MIMO layer number is 2 layers.

In an embodiment of the present disclosure, the first signaling includes a MIMO-LayersUL-v1xyz signaling.

In an embodiment of the present disclosure, a signaling set related to the first signaling includes at least one of a featureSetsUplinkPerCC-v1xyz signaling, a mimo-CB-PUSCH-v1xyz signaling, a maxNumberMIMO-LayersCB-PUSCH-v1xyz signaling, a maxNumberSRS-ResourcePerSet-v1xyz signaling, or a maxNumberMIMO-LayersNonCB-PUSCH-v1xyz signaling.

In an embodiment of the present disclosure, an entry corresponding to the MIMO-LayersUL-v1xyz signaling, an entry corresponding to the featureSetsUplinkPerCC-v1xyz signaling, an entry corresponding to the mimo-CB-PUSCH-v1xyz signaling, an entry corresponding to the maxNumberMIMO-LayersCB-PUSCH-v1xyz signaling, an entry corresponding to the maxNumberSRS-ResourcePerSet-v1xyz signaling and an entry corresponding to the maxNumberMIMO-LayersNonCB-PUSCH-v1xyz signaling are consistent.

Figure 13:
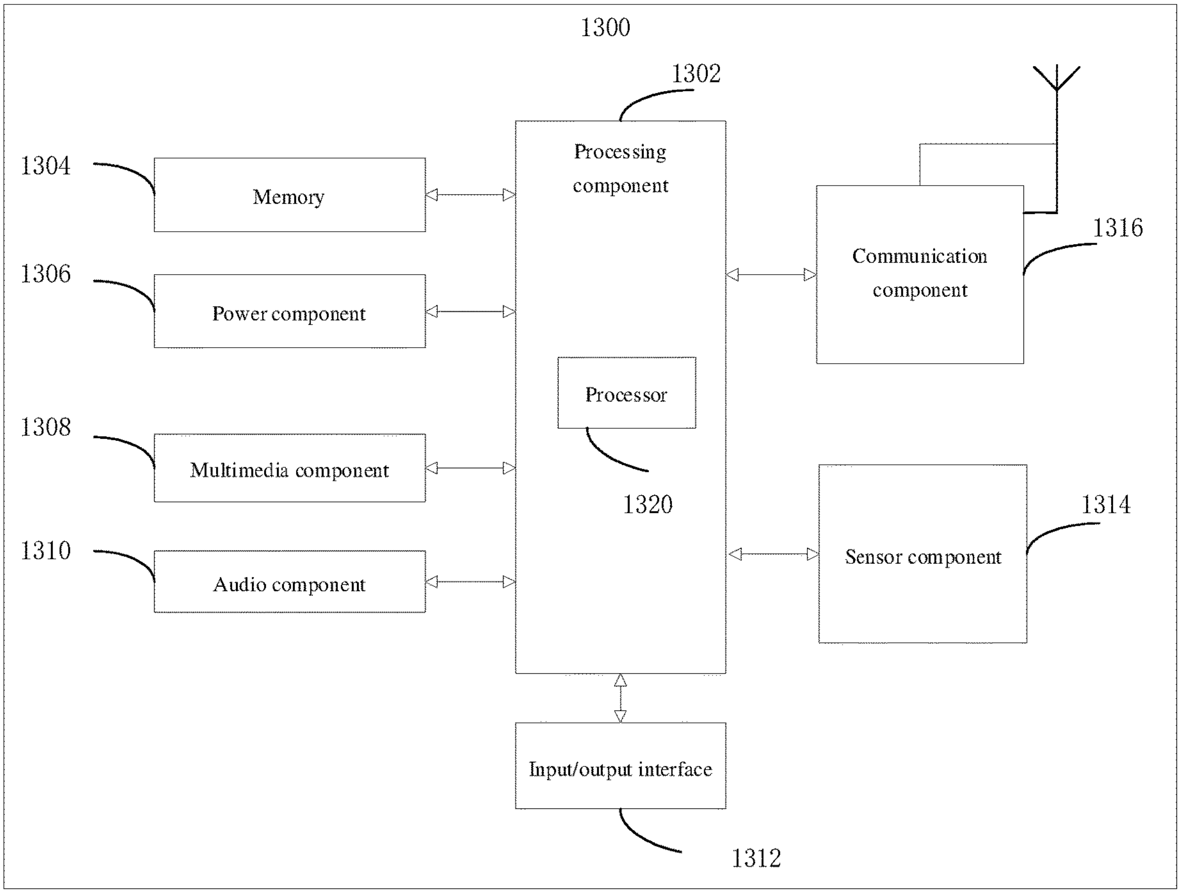
FIG. 13 is a block diagram of a user equipment provided by an embodiment of the present disclosure.

FIG. 13 is a block diagram of a User Equipment (UE) 1300 provided by an embodiment of the present disclosure. For example, the UE 1300 may be a mobile phone, a computer, a digital broadcast terminal device, a messaging device, a gaming console, a tablet, a medical device, an exercise device, a personal digital assistant, etc.

Referring to FIG. 13, the UE 1300 may include at least one of the following components: a processing component 1302, a memory 1304, a power component 1306, a multimedia component 1308, an audio component 1310, an input/output (I/O) interface 1312, a sensor component 1314, and a communication component 1316.

The processing component 1302 typically controls overall operations of the UE 1300, such as the operations associated with display, telephone calls, data communications, camera operations, and recording operations. The processing component 1302 may include at least one processor 1320 to execute instructions to perform all or part of the steps in the above described methods. Moreover, the processing component 1302 may include at least one module which facilitates the interaction between the processing component 1302 and other components. For instance, the processing component 1302 may include a multimedia module to facilitate the interaction between the multimedia component 1308 and the processing component 1302.

The memory 1304 is configured to store various types of data to support the operation of the UE 1300. Examples of such data include instructions for any applications or methods operated on the UE 1300, contact data, phonebook data, messages, pictures, video, etc. The memory 1304 may be implemented using any type of volatile or non-volatile memory apparatuses, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1306 provides power to various components of the UE 1300. The power component 1306 may include a power management system, at least one power source, and any other components associated with the generation, management, and distribution of power in the UE 1300.

The multimedia component 1308 includes a screen providing an output interface between the UE 1300 and the user. In some embodiments, the screen may include a liquid crystal display (LCD) and a touch panel (TP). If the screen includes the touch panel, the screen may be implemented as a touch screen to receive input signals from the user. The touch panel includes at least one touch sensor to sense touches, swipes, and gestures on the touch panel. The touch sensors may not only sense a boundary of a touch or swipe action, but also sense a wake-up time and a pressure associated with the touch or swipe action. In some embodiments, the multimedia component 1308 includes a front camera and/or a rear camera. The front camera and the rear camera may receive an external multimedia datum while the UE 1300 is in an operation mode, such as a photographing mode or a video mode. Each of the front camera and the rear camera may be a fixed optical lens system or have focus and optical zoom capability.

The audio component 1310 is configured to output and/or input audio signals. For example, the audio component 1310 includes a microphone (MIC) configured to receive an external audio signal when the UE 1300 is in an operation mode, such as a call mode, a recording mode, and a voice recognition mode. The received audio signal may be further stored in the memory 1304 or transmitted via the communication component 1316. In some embodiments, the audio component 1310 further includes a speaker to output audio signals.

The I/O interface 1312 provides an interface between the processing component 1302 and peripheral interface modules, such as a keyboard, a click wheel, buttons, and the like. The buttons may include, but are not limited to, a home button, a volume button, a starting button, and a locking button.

The sensor component 1314 includes at least one sensor to provide state assessments of various aspects of the UE 1300. For instance, the sensor component 1314 may detect an open/closed state of the UE 1300, relative positioning of components, e.g., the display and the keypad, of the UE 1300, a change in position of the UE 1300 or a component of the UE 1300, a presence or absence of user contact with the UE 1300, an orientation or an acceleration/deceleration of the UE 1300, and a change in temperature of the UE 1300. The sensor component 1314 may include a proximity sensor configured to detect the presence of nearby objects without any physical contact. The sensor component 1314 may further include a light sensor, such as a CMOS or CCD image sensor, for use in imaging applications. In some embodiments, the sensor component 1314 may further include an accelerometer sensor, a gyroscope sensor, a magnetic sensor, a pressure sensor, or a temperature sensor.

The communication component 1316 is configured to facilitate communication, wired or wirelessly, between the UE 1300 and other devices. The UE 1300 may access a wireless network based on a communication standard, such as WiFi, 2G, or 3G, or a combination thereof. In an embodiment, the communication component 1316 receives a broadcast signal or broadcast associated information from an external broadcast management system via a broadcast channel. In an embodiment, the communication component 1316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an embodiment of the present disclosure, the UE 1300 may be implemented with at least one application specific integrated circuit (ASIC), digital signal processor (DSP), digital signal processing device (DSPD), programmable logic device (PLD), field programmable gate array (FPGA), controller, micro-controller, microprocessor, or other electronic components, for performing the above described methods.

Figure 14:
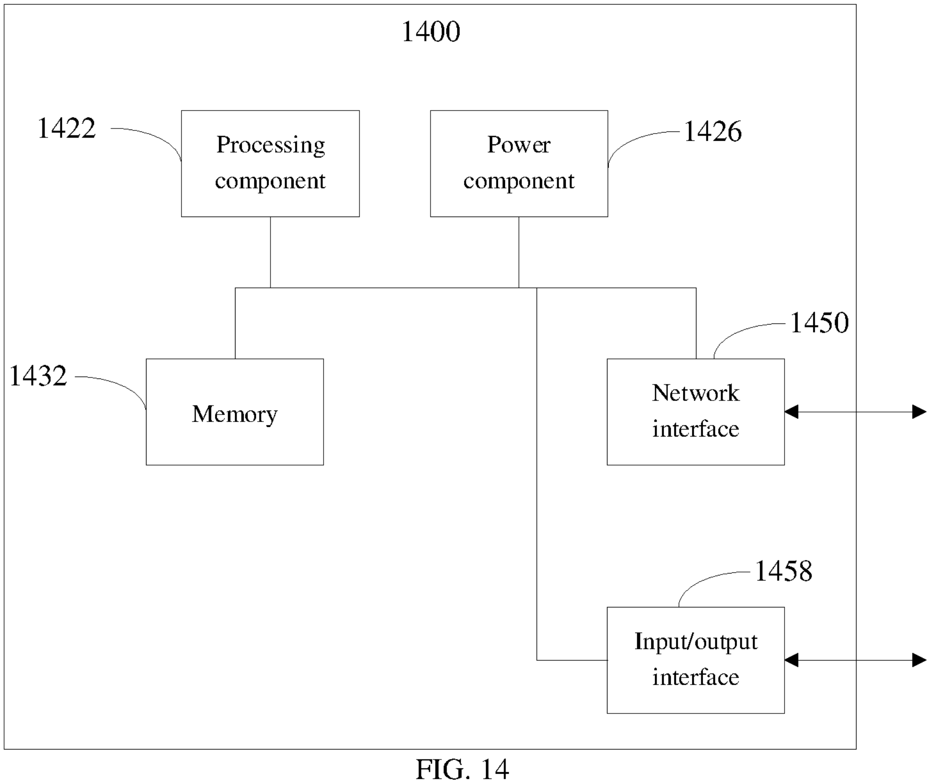
FIG. 14 is a block diagram of a network device provided by an embodiment of the present disclosure.

FIG. 14 is a block diagram of a network device 1400 provided by an embodiment of the present disclosure. For example, the network device 1400 may be provided as a network device. Referring to FIG. 14, the network device 1400 includes a processing component 1422, which further includes at least one processor and a memory resource represented by a memory 1432 for storing instructions executable by the processing component 1422, such as an application program. The application program stored in the memory 1432 may include one or more modules, each corresponding to a set of instructions. In addition, the processing component 1422 is configured to execute the instructions to execute the aforementioned any method applied on the network device, for example, the method shown in FIG. 1.

The network device 1400 may further include: a power component 1426 configured to perform power management of the network device 1400, a wired or wireless network interface 1450 configured to connect the network device 1400 to the network, and an input/output (I/O) interface 1458. The network device 1400 may operate an operating system stored in the memory 1432, such as Windows Server™, Mac OS X™, Unix™, Linux™, FreeBSD™, or the like.

In the above embodiments provided by the present disclosure, the methods provided by embodiments of the present disclosure are introduced from the perspectives of the network device and the UE. In order to achieve various functions of the methods provided in embodiments of the present disclosure, the network device and the UE may include hardware structures and software modules, and the various functions are implemented in the form of hardware structures, software modules, or hardware structures plus software modules. One of the various functions may be implemented in the form of hardware structures, software modules, or hardware structure plus software modules.

In the above embodiments provided by the present disclosure, the methods provided by embodiments of the present disclosure are introduced from the perspectives of the network device and the UE. In order to achieve various functions of the methods provided in embodiments of the present disclosure, the network device and the UE may include hardware structures and software modules, and the various functions are implemented in the form of hardware structures, software modules, or hardware structures plus software modules. One of the various functions may be implemented in the form of hardware structures, software modules, or hardware structure plus software modules.

Embodiments of the present disclosure provide a communication device. The communication device may include a transceiver module and a processing module. The transceiver module may include a transmitting module and/or a receiving module. The transmitting module is configured to implement a transmission function, and the receiving module is configured to implement a reception function. The transceiver module may implement the transmission function and/or the reception function.

The communication device may be a terminal device (such as the terminal device in the above method embodiments), a device in the terminal device, or a device that can be used in conjunction with the terminal device. Alternatively, the communication device may be a network device, a device in the network device, or a device that can be used in conjunction with the network device.

Embodiments of the present disclosure provide another communication device. The communication device may be a network device, or may be a terminal device (such as the terminal device in the above method embodiments), or may be a chip, a chip system, a processor or the like that supports the network device to implement the above method, or may be a chip, a chip system, a processor or the like that supports the terminal device to implement the above method. The device can be used to implement the method described in the above method embodiments. For details, reference may be made to the description in the above method embodiments.

The communication device may include one or more processors. The processor may be a general-purpose processor or a dedicated processor, or the like. For example, the processor may be a baseband processor or a central processing unit. The baseband processor can be used to process communication protocols and communication data. The central processor can be used to control the communication devices (such as network devices, baseband chips, terminal devices, terminal device chips, DU or CU, or the like), execute computer programs, and process data for the computer programs.

In embodiments of the present disclosure, the communication device may further include one or more memories, on which a computer program may be stored. The processor executes the computer program, so that the communication device performs the method described in the above method embodiments. In embodiments of the present disclosure, the memory may also store data. The communication device and the memory can be provided separately or integrated together.

In embodiments of the present disclosure, the communication device may further include a transceiver and an antenna. The transceiver may be referred to as a transceiver unit, a transceiver, a transceiver circuit, or the like, and is used to implement transceiver functions. The transceiver may include a receiver and a transmitter. The receiver may be referred to as a receiver or a receiving circuit, or the like, and is used to implement the receiving function; and the transmitter may be referred to as a transmitter, a transmitting circuit, or the like, and is used to implement the transmitting function.

In embodiments of the present disclosure, the communication device may further include one or more interface circuits. The interface circuit is used to receive code instructions and transmit the code instructions to the processor. The processor executes the code instructions to cause the communication device to perform the method described in the above method embodiments.

The communication device is a terminal device (such as the terminal device in the foregoing method embodiments), and the processor is configured to execute the method shown in any one of FIGS. 1-4.

The communication device is a network device, and the transceiver is configured to execute the method shown in any one of FIGS. 5-7.

In an implementation of the present disclosure, the processor may include a transceiver for implementing receiving and transmitting functions. For example, the transceiver may be a transceiver circuit, an interface, or an interface circuit. The transceiver circuits, interfaces or interface circuits used to implement the receiving and transmitting functions can be separate or integrated together. The above-mentioned transceiver circuit, interface or interface circuit can be used for reading and writing codes/data, or the above-mentioned transceiver circuit, interface or interface circuit can be used for signal transmission or transfer.

In an implementation of the present disclosure, the processor may be stored with a computer program, and the computer program is executed by the processor, causing the communication device to perform the method described in the above method embodiments. The computer program may be solidified in the processor, in which case the processor may be implemented by hardware.

In an implementation of the present disclosure, the communication device may include a circuit, and the circuit may implement the functions of sending or receiving or communicating in the foregoing method embodiments. The processors and transceivers described in the present disclosure may be implemented on an integrated circuit (IC), an analog IC, a radio frequency integrated circuit (RFIC), a mixed signal IC, an application specific integrated circuit (ASIC), a printed circuit boards (PCB), an electronic device, and the like. The processor and transceiver can also be manufactured using various IC process technologies, such as complementary metal oxide semiconductor (CMOS), N-type metal oxide semiconductor (nMetal-oxide-semiconductor, NMOS), P-type metal oxide semiconductor (positive channel metal oxide semiconductor, PMOS), bipolar junction transistor (BJT), bipolar CMOS (BiCMOS), silicon germanium (SiGe), gallium arsenide (GaAs), and the like.

The communication device described in the above embodiments may be the network device or the terminal device (e.g., the terminal device in the above method embodiments), but the scope of the communication device described in the present disclosure is not limited thereto, and the structure of the communication device may not be limited. The communication device may be a stand-alone device or may be part of a larger device. For example, the communication device may be:

(1) a stand-alone integrated circuit IC, or chip, or chip system or subsystem;

(2) a set of one or more ICs. In embodiments of the present disclosure, the IC set may further include storage components for storing data and computer programs;

(3) an ASIC, such as a modem;

(4) a module that can be embedded in another device;

(5) a receiver, a terminal device, an intelligent terminal device, a cellular phone, a wireless device, a handheld device, a mobile unit, a vehicle-mounted device, a network device, a cloud device, an artificial intelligence device, and the like;

(6) others, etc.

In a case that the communication device may be a chip or a system on a chip, the chip includes a processor and an interface. The number of processors may be one or more, and the number of interfaces may be multiple.

In an embodiment of the present disclosure, the chip further includes a memory, and the memory is configured to store necessary computer programs and data.

Those skilled in the art can also understand that the various illustrative logical blocks and steps listed in the embodiments of the present disclosure can be implemented by electronic hardware, computer software, or a combination of both. Whether such functionality is implemented in hardware or software depends on the specific application and overall system design requirements. Those skilled in the art can use various methods to implement the described functions for each specific application, but such implementation should not be understood as exceeding the scope of protection of the embodiments of the present disclosure.

Embodiments of the present disclosure further provide a system for determining a sidelink duration. The system includes the communication device as the terminal device (such as the first terminal device in the above method embodiments) and the communication device as the network device in the above embodiments, or the system includes the communication device as the terminal device (such as the first terminal device in the above method embodiments) and the communication device as the network device in the above embodiments.

The present disclosure further provides a readable storage medium on which instructions are stored. When the instructions are executed by a computer, the functions of any of the above method embodiments are implemented.

The present disclosure further provides a computer program product, which, when been executed by a computer, implements the functions of any of the above method embodiments.

The present disclosure provides a reporting method and apparatus, a user equipment, a network device and a storage medium to solve the existing imbalance in throughput between uplink and downlink.

A reporting method provided by an aspect of embodiments of the present disclosure is applied to a UE and includes:

reporting, through a first signaling, to a network device a maximum uplink Multiple-In Multiple-Out (MIMO) layer number supported by the UE, and reporting, through a second signaling, to the network device a maximum uplink MIMO layer number supported by the UE, wherein the maximum uplink MIMO layer number reported through the first signaling is different from the maximum uplink MIMO layer number reported through the second signaling; or reporting, through the first signaling and/or the second signaling, to the network device a maximum uplink MIMO layer number supported by the UE, wherein the maximum uplink MIMO layer number reported through the first signaling is the same as the maximum uplink MIMO layer number reported through the second signaling.

A reporting method provided by another aspect of embodiments of the present disclosure is applied to a base stations and includes:

acquiring a first signaling and a second signaling reported by a UE, wherein the first signaling includes a maximum uplink MIMO layer number supported by the UE, the second signaling includes a maximum uplink MIMO layer number supported by the UE, and the maximum uplink MIMO layer number included in the first signaling is different from the maximum uplink MIMO layer number included in the second signaling; or acquiring the first signaling and/or the second signaling reported by the UE, wherein the maximum uplink MIMO layer number included in the first signaling is the same as the maximum uplink MIMO layer number included in the second signaling; and configuring a MIMO layer number for the UE based on the first signaling and/or the second signaling.

A reporting-based apparatus provided by another aspect of embodiments of the present disclosure includes:

a reporting module, configured to report, through a first signaling, to a network device a maximum uplink MIMO layer number supported by a UE, and report, through a second signaling, to the network device a maximum uplink MIMO layer number supported by the UE, wherein the maximum uplink MIMO layer number reported through the first signaling is different from the maximum uplink MIMO layer number reported through the second signaling; or report, through the first signaling and/or the second signaling, to the network device a maximum uplink MIMO layer number supported by the UE, wherein the maximum uplink MIMO layer number reported through the first signaling is the same as the maximum uplink MIMO layer number reported through the second signaling.

A reporting-based apparatus provided by yet another aspect of embodiments of the present disclosure includes:

an acquisition module, configured to acquire a first signaling and a second signaling reported by a UE, wherein the first signaling includes a maximum uplink MIMO layer number supported by the UE, the second signaling includes a maximum uplink MIMO layer number supported by the UE, and the maximum uplink MIMO layer number included in the first signaling is different from the maximum uplink MIMO layer number included in the second signaling; or acquire the first signaling and/or the second signaling reported by the UE, wherein the maximum uplink MIMO layer number included in the first signaling is the same as the maximum uplink MIMO layer number included in the second signaling; and a configuration module, configured to configure a MIMO layer number for the UE based on the first signaling and/or the second signaling.

A communication device provided by still another aspect of embodiments of the present disclosure includes a processor and a memory, wherein a computer program is stored in the memory, and the processor executes the computer program stored in the memory to cause the communication device to execute the method provided in the aspect of the above embodiments.

A communication device provided by still another aspect of embodiments of the present disclosure includes a processor and a memory, wherein a computer program is stored in the memory, and the processor executes the computer program stored in the memory to cause the communication device to execute the method provided in the other aspect of the above embodiments.

A communication device provided by still another aspect of embodiments of the present disclosure includes a processor and an interface circuit; and wherein the interface circuit is configured to receive code instructions and transmit the code instructions to the processor; and the processor is configured to run the code instructions to execute the method provided in the aspect of the above embodiments.

A communication device provided by still another aspect of embodiments of the present disclosure includes a processor and an interface circuit; and wherein interface circuit is configured to receive code instructions and transmit the code instructions to the processor; and the processor is configured to run the code instructions to execute the method provided in the other aspect of the above embodiments.

A computer-readable storage medium provided by still another aspect of embodiments of the present disclosure is configured to store instructions, wherein the instructions, when executed, cause the method provided in the aspect of the above embodiments.

A computer-readable storage medium provided by still another aspect of embodiments of the present disclosure is configured to store instructions, wherein the instructions, when executed, cause the method provided in the other aspect of the above embodiments.

To sum up, in the reporting method and apparatus, the user equipment, the base station and the storage medium provided by embodiments of the present disclosure, the UE will report, through the first signaling, to the network device the maximum uplink MIMO layer number supported by it, and/or, report, through the second signaling, to the network device the maximum uplink MIMO layer number supported by it. The maximum uplink MIMO layer number reported through the first signaling is the same as or different from the maximum uplink MIMO layer number reported through the second signaling. Specifically, in embodiments of the present disclosure, when the maximum uplink MIMO layer number supported by the UE is 3, it may be reported to the network device through the first signaling. That is, in embodiments of the present disclosure, the first signaling can support the UE to report that it supports the maximum-3-layer uplink MIMO capability, thereby improving the uplink performance of the UE without breaking the implementation constraints of the UE.

In the above embodiments, it may be implemented in whole or in part by software, hardware, firmware, or any combination thereof. When implemented by software, it may be implemented in whole or in part in the form of a computer program product. The computer program product includes one or more computer programs. When the computer program is loaded and executed on a computer, the processes or functions described in accordance with the embodiments of the present disclosure are generated in whole or in part. The computer may be a general-purpose computer, a dedicated computer, a computer network, or other programmable device. The computer program may be stored in a computer-readable storage medium, or been transferred from one computer-readable storage medium to another, for example, the computer program may be transferred from a website, computer, server, or data center to another website, computer, server or data center via wired (such as coaxial cable, optical fiber, digital subscriber line (DSL)) or wireless (such as infrared, wireless, microwave, or the like) means. The computer-readable storage medium may be any available medium that can be accessed by a computer, or a data storage device such as an integrated server, data center, or the like, that includes one or more available media. The available media may be magnetic media (e.g., floppy disks, hard disks, magnetic tapes), optical media (e.g., high-density digital video discs (DVD)), or semiconductor media (e.g., solid state disks, SSD)) or the like.

Those of ordinary skill in the art can understand that the first, second, and other numerical numbers involved in the present disclosure are only distinctions made for convenience of description and are not used to limit the scope of the embodiments of the disclosure, nor to indicate the order.

At least one in the present disclosure can also be described as one or more, and the plurality can be two, three, four or more, which is not limited in the present disclosure. In the embodiment of the present disclosure, for one type of technical feature, “first”, “second”, “third”, “A”, “B”, “C” and “D”, or the like are used to distinguish the technical features in the type of technical feature, and the technical features described with “first”, “second”, “third”, “A”, “B”, “C” and “D” are in no order of precedence or order of size.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including the common general knowledge or habitual technical means in the technical field not disclosed in the present disclosure. The specification and embodiments are considered as exemplary only, and a true scope and spirit of the present disclosure is indicated by the appending claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A reporting method, applied to a network device, and comprising:

acquiring a first signaling and a second signaling reported by a User Equipment (UE), wherein the first signaling comprises a maximum uplink Multiple-In Multiple-Out (MIMO) layer number supported by the UE, the second signaling comprises a maximum uplink MIMO layer number supported by the UE, and the maximum uplink MIMO layer number comprised in the first signaling is different from the maximum uplink MIMO layer number comprised in the second signaling; or acquiring at least one of the first signaling or the second signaling reported by the UE, wherein the maximum uplink MIMO layer number comprised in the first signaling is the same as the maximum uplink MIMO layer number comprised in the second signaling; and configuring a MIMO layer number for the UE based on at least one of the first signaling or the second signaling, wherein the maximum uplink MIMO layer number comprised in the first signaling is different from the maximum uplink MIMO layer number comprised in the second signaling;

the first signaling comprises a first maximum uplink MIMO layer number supported by the UE, and the second signaling comprises a second maximum uplink MIMO layer number supported by the UE;

the first maximum uplink MIMO layer number is a number whose reporting is not supported by the second signaling, and the second maximum uplink MIMO layer number is a maximum number, among a number whose reporting is supported by the second signaling, which is smaller than the first maximum uplink MIMO layer number; and the configuring the MIMO layer number for the UE based on the at least one of the first signaling or the second signaling comprises:

in a case that the network device is not equipped with a capability to identify the first signaling, ignoring the first signaling, identifying the second signaling to acquire the second maximum uplink MIMO layer number, and configuring the MIMO layer number for the UE based on the second maximum uplink MIMO layer number; and in a case that the network device is equipped with the capability to identify the first signaling, ignoring the second signaling, identifying the first signaling to acquire the first maximum uplink MIMO layer number, and configuring the MIMO layer number for the UE based on the first maximum uplink MIMO layer number.

2. The method according to claim 1, wherein the acquiring the at least one of the first signaling or the second signaling reported by the UE comprises:

acquiring the first signaling and the second signaling reported by the UE, wherein the first signaling and the second signaling both comprise a third maximum uplink MIMO layer number supported by the UE, and the third maximum uplink MIMO layer number is a number whose reporting is supported by the second signaling;

wherein the configuring the MIMO layer number for the UE based on the at least one of the first signaling or the second signaling comprises:

in a case that the network device is not equipped with a capability to identify the first signaling, ignoring the first signaling, identifying the second signaling to acquire the third maximum uplink MIMO layer number, and configuring the MIMO layer number for the UE based on the third maximum uplink MIMO layer number; and in a case that the network device is equipped with the capability to identify the first signaling, ignoring the second signaling, identifying the first signaling to acquire the third maximum uplink MIMO layer number, and configuring the MIMO layer number for the UE based on the third maximum uplink MIMO layer number.

3. The method according to claim 1, wherein the acquiring the at least one of the first signaling or the second signaling reported by the UE comprises:

acquiring the second signaling reported by the UE, wherein the second signaling comprises a third maximum uplink MIMO layer number supported by the UE;

wherein the configuring the MIMO layer number for the UE based on the at least one of the first signaling or the second signaling comprises:

identifying the second signaling to obtain the third maximum uplink MIMO layer number, and configuring the MIMO layer number for the UE based on the third maximum uplink MIMO layer number.

4. The method according to claim 1, wherein a number whose reporting is supported by the second signaling comprises at least one of 1 layer, 2 layers or 4 layers.

5. The method according to claim 1, wherein the first maximum uplink MIMO layer number is 3 layers, and the second maximum uplink MIMO layer number is 2 layers.

6. The method according to claim 1, wherein the first signaling comprises a MIMO-LayersUL-v1xyz signaling;

wherein a signaling set related to the first signaling comprises at least one of a featureSetsUplinkPerCC-v1xyz signaling, a mimo-CB-PUSCH-v1xyz signaling, a maxNumberMIMO-LayersCB-PUSCH-v1xyz signaling, a maxNumberSRS-ResourcePerSet-v1xyz signaling, or a maxNumberMIMO-LayersNonCB-PUSCH-v1xyz signaling; and wherein an entry corresponding to the MIMO-LayersUL-v1xyz signaling, an entry corresponding to the featureSetsUplinkPerCC-v1xyz signaling, an entry corresponding to the mimo-CB-PUSCH-v1xyz signaling, an entry corresponding to the maxNumberMIMO-LayersCB-PUSCH-v1xyz signaling, an entry corresponding to the maxNumberSRS-ResourcePerSet-v1xyz signaling and an entry corresponding to the maxNumberMIMO-LayersNonCB-PUSCH-v1xyz signaling are consistent.

7. A communication device, comprising:

a processor; and a memory storing a computer program executable by the processor, wherein the processor is configured to perform:

acquiring a first signaling and a second signaling reported by a User Equipment (UE), wherein the first signaling comprises a maximum uplink Multiple-In Multiple-Out (MIMO) layer number supported by the UE, the second signaling comprises a maximum uplink MIMO layer number supported by the UE, and the maximum uplink MIMO layer number comprised in the first signaling is different from the maximum uplink MIMO layer number comprised in the second signaling; or acquiring at least one of the first signaling or the second signaling reported by the UE, wherein the maximum uplink MIMO layer number comprised in the first signaling is the same as the maximum uplink MIMO layer number comprised in the second signaling; and configuring a MIMO layer number for the UE based on at least one of the first signaling or the second signaling, wherein the maximum uplink MIMO layer number comprised in the first signaling is different from the maximum uplink MIMO layer number comprised in the second signaling;

the first signaling comprises a first maximum uplink MIMO layer number supported by the UE, and the second signaling comprises a second maximum uplink MIMO layer number supported by the UE;

the first maximum uplink MIMO layer number is a number whose reporting is not supported by the second signaling, and the second maximum uplink MIMO layer number is a maximum number, among a number whose reporting is supported by the second signaling, which is smaller than the first maximum uplink MIMO layer number; and the configuring the MIMO layer number for the UE based on the at least one of the first signaling or the second signaling comprises:

in a case that the network device is not equipped with a capability to identify the first signaling, ignoring the first signaling, identifying the second signaling to acquire the second maximum uplink MIMO layer number, and configuring the MIMO layer number for the UE based on the second maximum uplink MIMO layer number; and in a case that the network device is equipped with the capability to identify the first signaling, ignoring the second signaling, identifying the first signaling to acquire the first maximum uplink MIMO layer number, and configuring the MIMO layer number for the UE based on the first maximum uplink MIMO layer number.

8. A communication device, comprising:

a processor; and an interface circuit; wherein:

the interface circuit is configured to receive code instructions and transmit the code instructions to the processor; and the processor is configured to run the code instructions to execute the method according to claim 1.

9. A non-transitory computer-readable storage medium storing instructions, wherein the instructions, when executed by a processor, cause the processor to perform the method according to claim 1.

10. A reporting method, applied to a network device, and comprising:

acquiring a first signaling and a second signaling reported by a User Equipment (UE), wherein the first signaling comprises a maximum uplink Multiple-In Multiple-Out (MIMO) layer number supported by the UE, the second signaling comprises a maximum uplink MIMO layer number supported by the UE, and the maximum uplink MIMO layer number comprised in the first signaling is different from the maximum uplink MIMO layer number comprised in the second signaling; or acquiring at least one of the first signaling or the second signaling reported by the UE, wherein the maximum uplink MIMO layer number comprised in the first signaling is the same as the maximum uplink MIMO layer number comprised in the second signaling; and configuring a MIMO layer number for the UE based on at least one of the first signaling or the second signaling, wherein the acquiring the at least one of the first signaling or the second signaling reported by the UE comprises:

acquiring the first signaling and the second signaling reported by the UE, wherein the first signaling and the second signaling both comprise a third maximum uplink MIMO layer number supported by the UE, and the third maximum uplink MIMO layer number is a number whose reporting is supported by the second signaling;

wherein the configuring the MIMO layer number for the UE based on the at least one of the first signaling or the second signaling comprises:

in a case that the network device is not equipped with a capability to identify the first signaling, ignoring the first signaling, identifying the second signaling to acquire the third maximum uplink MIMO layer number, and configuring the MIMO layer number for the UE based on the third maximum uplink MIMO layer number; and in a case that the network device is equipped with the capability to identify the first signaling, ignoring the second signaling, identifying the first signaling to acquire the third maximum uplink MIMO layer number, and configuring the MIMO layer number for the UE based on the third maximum uplink MIMO layer number.

11. The communication device according to claim 7, wherein the processor is further configured to perform the following operations:

acquiring the first signaling and the second signaling reported by the UE, wherein the first signaling and the second signaling both comprise a third maximum uplink MIMO layer number supported by the UE, and the third maximum uplink MIMO layer number is a number whose reporting is supported by the second signaling;

wherein the configuring the MIMO layer number for the UE based on the at least one of the first signaling or the second signaling comprises:

in a case that the network device is not equipped with a capability to identify the first signaling, ignoring the first signaling, identifying the second signaling to acquire the third maximum uplink MIMO layer number, and configuring the MIMO layer number for the UE based on the third maximum uplink MIMO layer number; and in a case that the network device is equipped with the capability to identify the first signaling, ignoring the second signaling, identifying the first signaling to acquire the third maximum uplink MIMO layer number, and configuring the MIMO layer number for the UE based on the third maximum uplink MIMO layer number.

12. The communication device according to claim 7, wherein the processor is further configured to perform the following operations:

acquiring the second signaling reported by the UE, wherein the second signaling comprises a third maximum uplink MIMO layer number supported by the UE;

wherein the configuring the MIMO layer number for the UE based on the at least one of the first signaling or the second signaling comprises:

identifying the second signaling to obtain the third maximum uplink MIMO layer number, and configuring the MIMO layer number for the UE based on the third maximum uplink MIMO layer number.

13. The communication device according to claim 7, wherein a number whose reporting is supported by the second signaling comprises at least one of 1 layer, 2 layers or 4 layers.

14. The communication device according to claim 7, wherein the first maximum uplink MIMO layer number is 3 layers, and the second maximum uplink MIMO layer number is 2 layers.

15. The communication device according to claim 7, wherein the first signaling comprises a MIMO-LayersUL-v1xyz signaling;

wherein a signaling set related to the first signaling comprises at least one of a featureSetsUplinkPerCC-v1xyz signaling, a mimo-CB-PUSCH-v1xyz signaling, a maxNumberMIMO-LayersCB-PUSCH-v1xyz signaling, a maxNumberSRS-ResourcePerSet-v1xyz signaling, or a maxNumberMIMO-LayersNonCB-PUSCH-v1xyz signaling; and wherein an entry corresponding to the MIMO-LayersUL-v1xyz signaling, an entry corresponding to the featureSetsUplinkPerCC-v1xyz signaling, an entry corresponding to the mimo-CB-PUSCH-v1xyz signaling, an entry corresponding to the maxNumberMIMO-LayersCB-PUSCH-v1xyz signaling, an entry corresponding to the maxNumberSRS-ResourcePerSet-v1xyz signaling and an entry corresponding to the maxNumberMIMO-LayersNonCB-PUSCH-v1xyz signaling are consistent.

* * * * *